(12) United States Patent
Ly et al.

(10) Patent No.: US 11,792,777 B2
(45) Date of Patent: Oct. 17, 2023

(54) PEAK TO AVERAGE POWER RATIO REDUCTION FOR SUPPLEMENTARY UPLINK

(71) Applicant: QUALCOMM Incorporated, San Diego, CA (US)

(72) Inventors: Hung Dinh Ly, San Diego, CA (US); Saeid Sahraei, San Diego, CA (US); Gokul Sridharan, Sunnyvale, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/391,922

(22) Filed: Aug. 2, 2021

(65) Prior Publication Data
US 2022/0039093 A1 Feb. 3, 2022

Related U.S. Application Data

(60) Provisional application No. 63/060,534, filed on Aug. 3, 2020.

(51) Int. Cl.
*H04W 72/04* (2023.01)
*H04W 72/0453* (2023.01)

(52) U.S. Cl.
CPC ............... *H04W 72/0453* (2013.01)

(58) Field of Classification Search
None
See application file for complete search history.

(56) References Cited

U.S. PATENT DOCUMENTS

2009/0141823 A1\* 6/2009 Long .................. H04L 27/2618
375/260
2020/0260424 A1 8/2020 Guo et al.

FOREIGN PATENT DOCUMENTS

EP          1838062 A1 \*  9/2007  ......... H04L 27/2614
WO     2019086012 A1     5/2019

OTHER PUBLICATIONS

International Search Report and Written Opinion—PCT/US2021/044343—ISA/EPO—dated Nov. 16, 2021.
Tellado-Mourelo J., "Peak to Average Power Reduction for Multicarrier Modulation", A Dissertation Submitted to the Department of Electrical Engineering and the Committee on Graduate Studies of Stanford University In Partial Fulfillment of the Requirements for the Degree of Doctor of Philosophy, XX, XX, Sep. 1, 1999, (Sep. 1, 1999), 163 pages, XP001223601, p. 66, paragraph [04.2], paragraph [04.2], p. 83, paragraph [04.6], p. 91, figure 3.18, paragraph [03.9], p. 66-p. 99, figure 4.1, p. 100-p. 122, figure 5.1.

(Continued)

*Primary Examiner* — Saba Tsegaye
(74) *Attorney, Agent, or Firm* — Loza & Loza, LLP

(57) ABSTRACT

Aspects relate using peak reduction tones on a supplementary uplink to reduce peak to average power ratio on the supplementary uplink. For example, when a UE elects to switch from a primary carrier (e.g., a 5G NR carrier) to an SUL carrier (e.g., in a limited coverage scenario), the UE may use a defined set of PRTs to transmit data on the SUL carrier. In some examples, PRTs may be used on multiple carriers. For example, a first set of PRTs may be defined for an SUL carrier and a second set of PRTs may be defined for another carrier.

30 Claims, 15 Drawing Sheets

(56) References Cited

OTHER PUBLICATIONS

Wattanasuwakull T., et al., "PAPR Reduction for OFDM Transmission by Using a Method of Tone Reservation and Tone Injection," Information, Communication and Signal Processing, 2005 Fifth International Conference on Bangkok, Thailand Dec. 6-9, 2005, Piscataway, NJ, USA, IEEE, Piscataway, NJ, USA, Dec. 6, 2005 (Dec. 6, 2005), pp. 273-277, XP010936784, DOI: 10.1109/ICICS.2005.1689049, ISBN: 978-0-7803-9283-0, Abstract Paragraph [III.A]—Paragraph [III.B].

* cited by examiner

PEAK TO AVERAGE POWER RATIO REDUCTION FOR SUPPLEMENTARY UPLINK

CROSS-REFERENCE TO RELATED APPLICATIONS

The present application for patent claims priority to and the benefit of U.S. Provisional Patent Application No. 63/060,534, titled "PEAK TO AVERAGE POWER RATIO REDUCTION FOR SUPPLEMENTARY UPLINK" filed Aug. 3, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to using peak reduction tones on a supplementary uplink to reduce peak to average power ratio on the supplementary uplink.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving a first resource allocation for a supplementary uplink (SUL) carrier. The first resource allocation may indicate a first set of transmission tones including a first set of data tones and a first set of peak reduction tones (PRTs). The first resource allocation may further indicate a first set of data tone locations within a first bandwidth. The first resource allocation may further indicate a first set of peak reduction tone (PRT) locations within the first bandwidth. The first set of PRT locations may be arranged relative to the first set of data tone locations according to a first PRT sequence. The method may also include transmitting a first data transmission on the SUL carrier. The first data transmission may include a first waveform based at least in part on the first resource allocation.

In some examples, a user equipment may include a transceiver, a memory, and a processor coupled to the transceiver and the memory. The processor and the memory may be configured to receive a first resource allocation for a supplementary uplink (SUL) carrier via the transceiver. The first resource allocation may indicate a first set of transmission tones including a first set of data tones and a first set of peak reduction tones (PRTs). The first resource allocation may further indicate a first set of data tone locations within a first bandwidth. The first resource allocation may further indicate a first set of PRT locations within the first bandwidth. The first set of PRT locations may be arranged relative to the first set of data tone locations according to a first PRT sequence. The processor and the memory may also be configured to transmit a first data transmission on the SUL carrier via the transceiver. The first data transmission may include a first waveform based at least in part on the first resource allocation.

In some examples, a user equipment may include means for receiving a first resource allocation for a supplementary uplink (SUL) carrier. The first resource allocation may indicate a first set of transmission tones including a first set of data tones and a first set of peak reduction tones (PRTs). The first resource allocation may further indicate a first set of data tone locations within a first bandwidth. The first resource allocation may further indicate a first set of PRT locations within the first bandwidth. The first set of PRT locations may be arranged relative to the first set of data tone locations according to a first PRT sequence. The user equipment may also include means for transmitting a first data transmission on the SUL carrier. The first data transmission may include a first waveform based at least in part on the first resource allocation.

In some examples, an article of manufacture for use by a user equipment includes a computer-readable medium having stored therein instructions executable by one or more processors of the user equipment to receive a first resource allocation for a supplementary uplink (SUL) carrier. The first resource allocation may indicate a first set of transmission tones including a first set of data tones and a first set of peak reduction tones (PRTs). The first resource allocation may further indicate a first set of data tone locations within a first bandwidth. The first resource allocation may further indicate a first set of PRT locations within the first bandwidth. The first set of PRT locations may be arranged relative to the first set of data tone locations according to a first PRT sequence. The computer-readable medium may also have stored therein instructions executable by one or more processors of the user equipment to transmit a first data transmission on the SUL carrier. The first data transmission may include a first waveform based at least in part on the first resource allocation.

One or more of the following features may be applicable to any of the method, the apparatuses, and the computer-readable medium of the preceding paragraphs. The first resource allocation may include a first indication of the first PRT sequence. The user equipment may determine the first PRT sequence from the first indication. The first indication may include a first index for a PRT table. The PRT table may indicate (e.g., include entries for) the first PRT sequence and a second PRT sequence. The user equipment may receive a second resource allocation for a second uplink carrier that is different from the SUL carrier. The second resource allocation may indicate a second set of transmission tones. The user equipment may transmit a second data transmission on the second uplink carrier using a second waveform based at least in part on the second resource allocation. The SUL carrier may be associated with a first frequency band, the second uplink carrier may be associated with a second frequency band, and the first frequency band may be lower in frequency than the second frequency band. The second set of transmission tones may include a second set of data tones and a second set of peak reduction tones (PRTs). The second resource allocation may further indicate a second set of data tone locations within a second bandwidth. The second resource allocation may further indicate a second set of PRT locations within the second bandwidth. The second set of PRT locations may be arranged relative to the second set of data tone locations according to a second PRT sequence. The second resource allocation may include a second indication of the second PRT sequence. The user equipment may determine the second PRT sequence from the second indication. The second indication may include a second index for the PRT table.

In some examples, a method for wireless communication at a base station is disclosed. The method may include transmitting a first resource allocation for a supplementary uplink (SUL) carrier. The first resource allocation may indicate a first set of transmission tones including a first set of data tones and a first set of peak reduction tones (PRTs). The first resource allocation may further indicate a first set of data tone locations within a first bandwidth. The first resource allocation may further indicate a first set of PRT locations within the first bandwidth. The first set of PRT locations may be arranged relative to the first set of data tone locations according to a first PRT sequence. The method may also include receiving a first data transmission on the SUL carrier after transmitting the first resource allocation. The first data transmission may include a first waveform based at least in part on the first resource allocation.

In some examples, a base station may include a transceiver, a memory, and a processor coupled to the transceiver and the memory. The processor and the memory may be configured to transmit a first resource allocation for a supplementary uplink (SUL) carrier. The first resource allocation may indicate a first set of transmission tones including a first set of data tones and a first set of peak reduction tones (PRTs). The first resource allocation may further indicate a first set of data tone locations within a first bandwidth. The first resource allocation may further indicate a first set of PRT locations within the first bandwidth. The first set of PRT locations may be arranged relative to the first set of data tone locations according to a first PRT sequence. The processor and the memory may also be configured to receive a first data transmission on the SUL carrier via the transceiver after transmitting the first resource allocation. The first data transmission may include a first waveform based at least in part on the first resource allocation.

In some examples, a base station may include means for transmitting a first resource allocation for a supplementary uplink (SUL) carrier. The first resource allocation may indicate a first set of transmission tones including a first set of data tones and a first set of peak reduction tones (PRTs). The first resource allocation may further indicate a first set of data tone locations within a first bandwidth. The first resource allocation may further indicate a first set of PRT locations within the first bandwidth. The first set of PRT locations may be arranged relative to the first set of data tone locations according to a first PRT sequence. The base station may also include means for receiving a first data transmission on the SUL carrier after transmitting the first resource allocation. The first data transmission may include a first waveform based at least in part on the first resource allocation.

In some examples, an article of manufacture for use by a base station includes a non-transitory computer-readable medium having stored therein instructions executable by one or more processors of the base station to transmit a first resource allocation for a supplementary uplink (SUL) carrier. The first resource allocation may indicate a first set of transmission tones including a first set of data tones and a first set of peak reduction tones (PRTs). The first resource allocation may further indicate a first set of data tone locations within a first bandwidth. The first resource allocation may further indicate a first set of PRT locations within the first bandwidth. The first set of PRT locations may be arranged relative to the first set of data tone locations according to a first PRT sequence. The computer-readable medium may also have stored therein instructions executable by one or more processors of the base station to receive a first data transmission on the SUL carrier after transmitting the first resource allocation. The first data transmission may include a first waveform based at least in part on the first resource allocation.

One or more of the following features may be applicable to any of the method, the apparatuses, and the computer-readable medium of the preceding paragraphs. The first resource allocation may include a first indication of the first PRT sequence. The first indication may include a first index for a PRT table. The PRT table may indicate (e.g., include entries for) the first PRT sequence and a second PRT sequence. The base station may transmit a second resource allocation for a second uplink carrier that is different from the SUL carrier. The second resource allocation may indicate a second set of transmission tones. The base station may receive a second data transmission on the second uplink carrier. The second data transmission may include a second waveform based at least in part on the second resource allocation. The SUL carrier may be associated with a first frequency band, the second uplink carrier may be associated with a second frequency band, and the first frequency band may be lower in frequency than the second frequency band. The second set of transmission tones may include a second set of data tones and a second set of PRTs. The second resource allocation may further indicate a second set of data tone locations within a second bandwidth. The second resource allocation may further indicate a second set of PRT locations within the second bandwidth. The second set of PRT locations may be arranged relative to the second set of data tone locations according to a second PRT sequence. The second resource allocation may include a second indication of the second PRT sequence. The second indication may include a second index for the PRT table.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
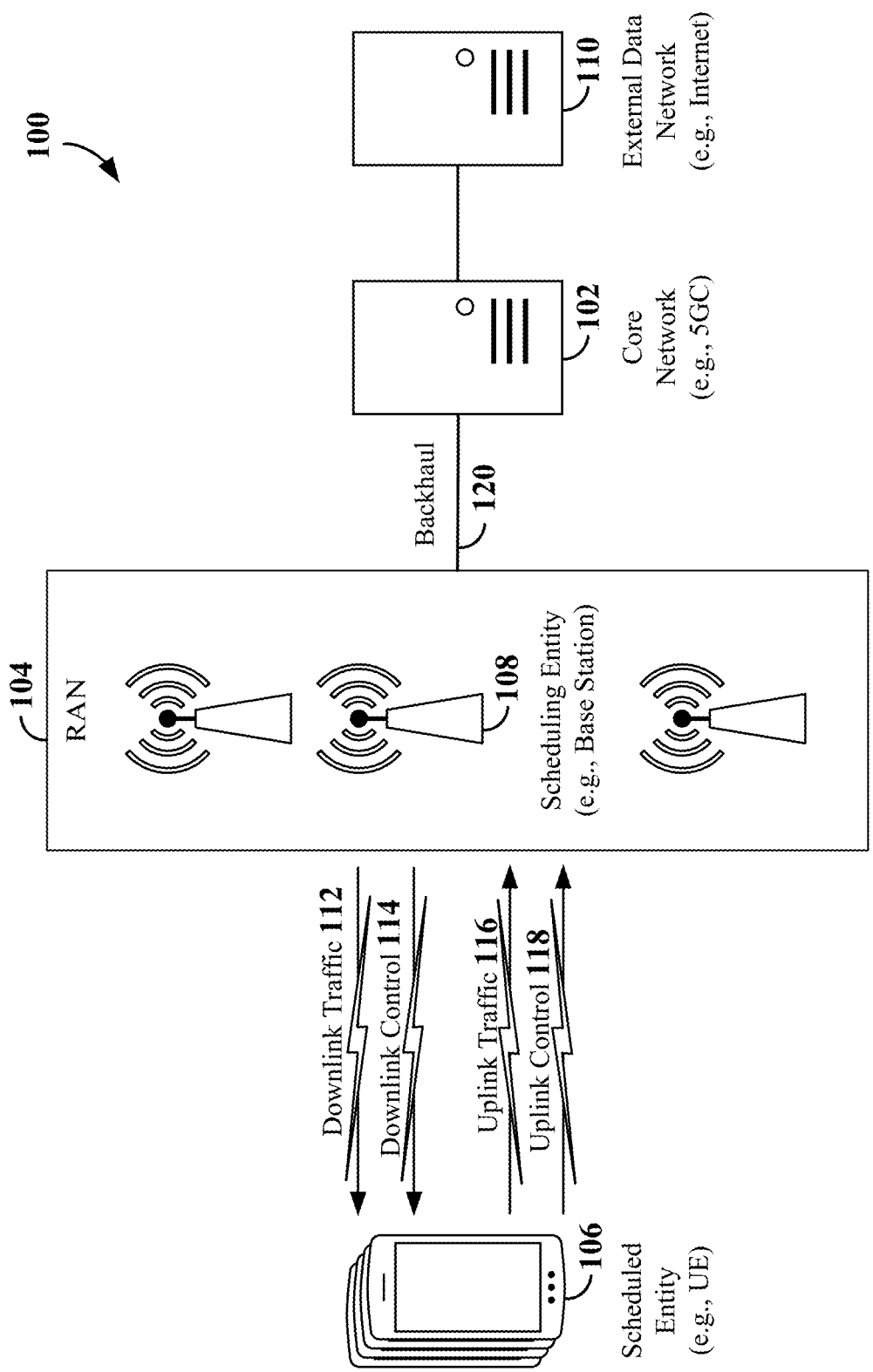
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The disclosure relates in some aspects to using peak reduction tones (PRTs) on a supplementary uplink (SUL) to reduce the peak to average power ratio (PAPR) on the SUL. For example, when a user equipment (UE) elects to switch from a primary carrier (e.g., a 5G NR carrier) to an SUL carrier (e.g., in a limited coverage scenario), the UE may use a defined set of PRTs to transmit data on the SUL carrier, whereby this set of PRTs serves to reduce the PAPR.

In some examples, PRTs may be used on multiple carriers. For example, a first set of PRTs may be defined for an SUL carrier and a second set of PRTs may be defined for another carrier (e.g., a primary carrier). Use of PRTs on a carrier may be dynamically enabled or disabled. For example, if the traffic load on a primary carrier is relatively high, uplink data on the primary carrier may be sent without using PRTs so that the tones that would otherwise be used for PRTs may instead be used for data transmissions.

In a system that uses orthogonal frequency division multiplexing (OFDM) signaling, conventional techniques for peak reduction tone (PRT) selection to reduce the PAPR may involve a relatively significant processing overhead that may reduce performance. In addition, a UE's selection of PRTs in such a system might not be known by the base station. In this case, the UE could signal an indication of the PRT selection to the base station to enable the base station to decode a received signal including the selected PRTs. Signaling such an indication, however, would lead to higher signaling overhead.

The disclosure relates in some aspects to PRT reservation using at least one PRT sequence that defines the locations of at least one PRT and at least one data tone in a set of transmission tones for uplink transmissions. In some examples, a base station may send an indication of the PRT sequence to be used for subsequent uplink transmissions on a particular carrier to a UE. This may facilitate savings in power and time during transmission, thereby improving performance and reducing the processing associated with PRT-based PAPR reduction.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
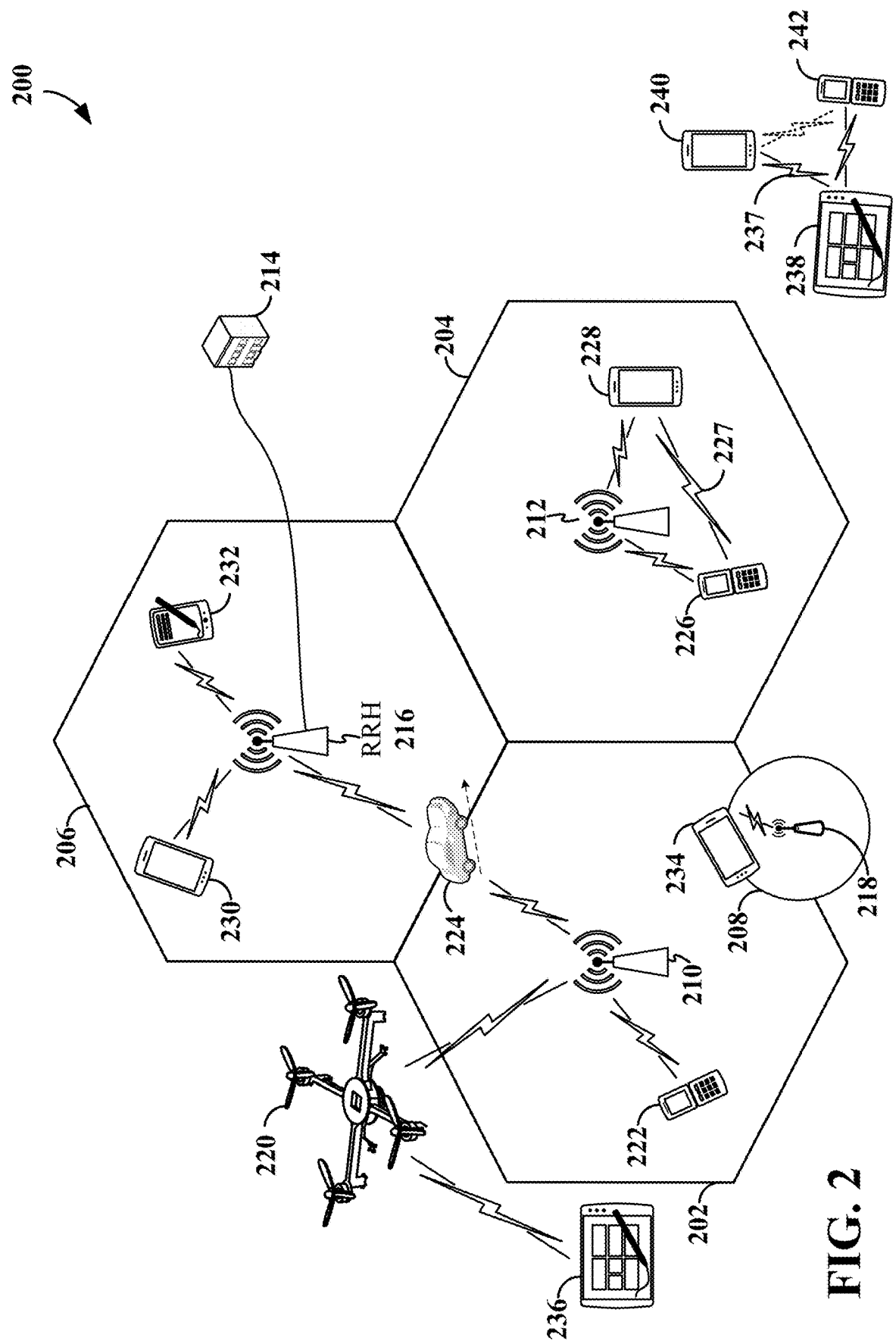
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
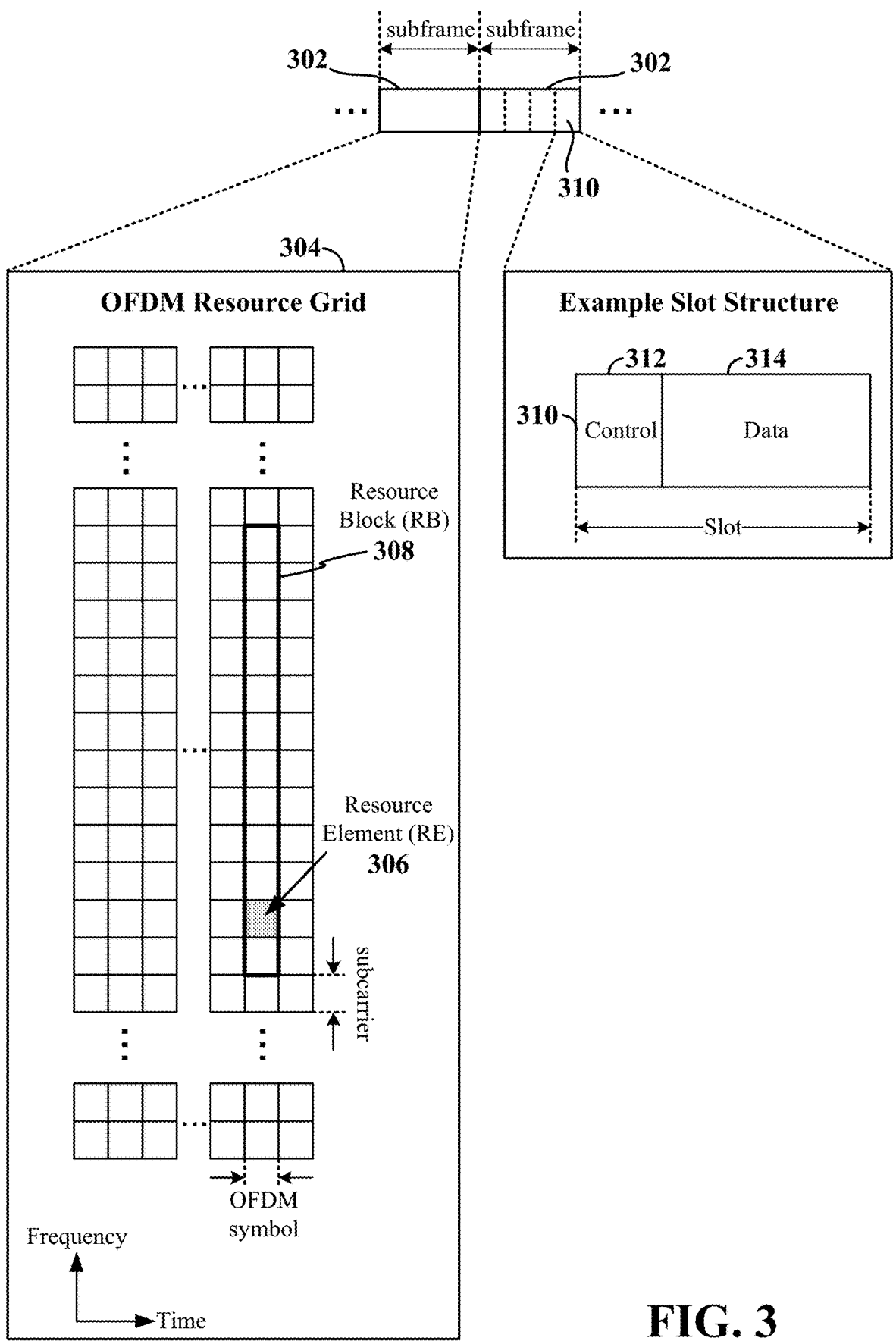
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
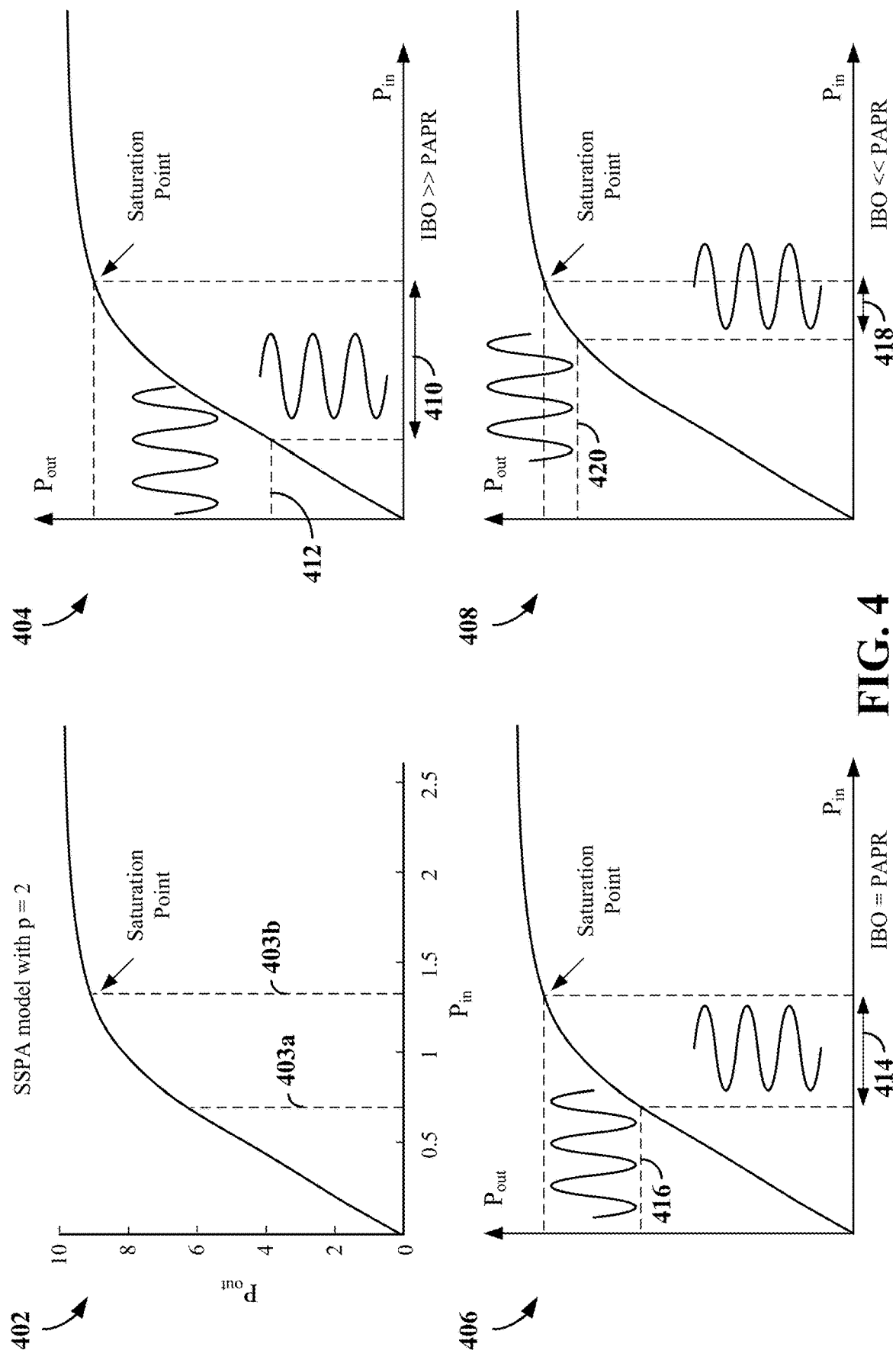
FIG. 4 is a conceptual illustration of examples of input backoffs and non-linearity for a power amplifier according to some aspects.

Commercial power amplifiers such as those used in wireless communication devices such as UEs and base stations typically exhibit non-linear behavior at higher levels of input power. The graph 402 of FIG. 4 illustrates an example of the power out (Pout) to power in (Pin) characteristics of a power amplifier (PA). Here, it may be seen that amplification by the PA is linear at a low levels of Pin. As Pin increases, however, the amplification becomes non-linear and the PA ultimately reaches a so-called saturation point (e.g., where further increases in Pin result in little or no increase in Pout).

This non-linearity may result in in-band and out-of-band distortion of the amplified signal, and a degraded (e.g., larger) error vector magnitude (EVM) at a receiver of the signal. To avoid this non-linearity, the power amplifier may be operated at a mean input power that is several decibels (dBs) lower than the saturation point. An appropriate power level may be determined by determining an input power that maintains a peak to average power ratio (PAPR) of the signal below a certain level. For example, if a signal has a PAPR of x dB, an input backoff (IBO) of x dB may be used to avoid the non-linear region of the PA even at the peak of the input signal. Here, an IBO may be defined as the distance between the operating range of the PA (e.g., an average input power as represented by a first vertical dashed line 403a) and an input power at the saturation point (e.g., an average input power as represented by a second vertical dashed line 403b).

FIG. 4 illustrates three examples of IBO values in a graph 404, a graph 406, and a graph 408. The graph 404 illustrates an IBO 410 that is much greater that the PAPR. This results in an inefficient use of the PA since the highest output power achieved 412 is much lower than the power out the PA is capable of providing in its linear range. The graph 406 illustrates an IBO 414 that is approximately equal to the PAPR. This results in an efficient use of the PA since the highest output power achieved 416 is relatively closer to the power out the PA is capable of providing, while still operating in the PA's linear operating range. The graph 408 illustrates an IBO 418 that is much less that the PAPR. This results in the PA operating in a non-linear region (near saturation) at and near the highest output power 420 (e.g., when the PAPR is relatively high).

The use of orthogonal frequency division multiplexing (OFDM) signaling is known to result in significant PAPR in some scenarios. This PAPR increases with the size of the frequency block. 5G NR is being developed to support higher data rates than LTE. Thus, 5G NR OFDM block sizes may be larger than LTE block sizes. Consequently, 5G NR transmissions may have an even higher PAPR.

Some PAPR reduction techniques may be data-dependent and computationally expensive. Consequently, these techniques may be unfit for a real-time implementation in the context of a 5G NR transmitter. Another PAPR reduction technique, clipping and filtering (CF), may be more suitable for a real-time implementation. However, CF may result in in-band distortion and often does not converge to a desirable solution.

5G NR provides a relative abundance of bandwidth both in the uplink and downlink. For example, 5G NR employs Frequency Range 2 (FR2) as well as increased bandwidth (e.g., up to 100 MHz in the Sub-6 GHz frequency range). This additional bandwidth may be exploited by using longer OFDM symbols. However, the use of longer OFDM symbols may increase the PAPR.

Tone reservation is another PAPR reduction technique. Advantageously, excess bandwidth (e.g., as in 5G NR) may be exploited for PAPR reduction in a tone reservation scheme. For example, tone reservation may involve a transmitter using otherwise-idle tones (e.g., sub-carriers) for reducing the PAPR of an OFDM signal. The magnitude and the phase of the reserved tones may be optimized for a given OFDM symbol to minimize the PAPR of the associated signal. In some cases, there might be no overlap between the data tones and the reserved tones. In these cases, tone reservation may be used without adding distortion to the signal (e.g., without increasing the EVM or the adjacent channel leakage ratio (ACLR)). The receiver may simply ignore the portion of the signal associated with the reserved tones and only decode the portion of the signal associated with the data tones.

In tone reservation, the magnitude and the phase of the reserved tones may be adjusted for each OFDM symbol. Moreover, a universally acceptable index allocation may be determined for the Peak Reduction Tones (PRTs). Fixing the location of the PRTs in advance can significantly improve the complexity of the transmitter since the optimization need not be done in real time. For example, if a UE is granted 2 RBs (e.g., 24 tones) for a transmission, and half of the available tones are used as PRTs, any subset of the 24 available tones may be selected for PRTs as long as the gNB is made aware of this choice (e.g., through signaling or by specifying the tone locations in advance). In some examples, the UE may obtain a waveform by taking the inverse fast Fourier transform (ifft) of the signal 500 shown in FIG. 5. Here the short lines (e.g., a line 502) represent the PRTs and the long lines (e.g., a line 504) represent the data signal (e.g., collectively, an OFDM symbol).

In some cases, PRT location selection may be performed by randomly selecting a set of PRT indices representing PRT locations, generating an OFDM signal based on the PRTs and the data tones, and determining whether the PAPR of the resulting signal satisfies a PAPR threshold. However, due to the random nature of the PRT selection for each iteration, these methods may introduce unnecessary processing that may create a reduction in performance Additionally, the selection of the PRTs might not be known by the base station. Thus, this selection may need to be signaled to the base station to facilitate decoding by the base station, thereby increasing signaling overhead.

Aspects of techniques and apparatuses described herein may facilitate PRT reservation for reducing PAPR of a power amplifier (e.g., in a UE, a BS, or some other communication device). In some aspects, tone reservation techniques described herein may facilitate PRT location determination based on established patterns, sequences, tables, and/or the like. In this way, PRT locations (e.g., a PRT index) may not need to be determined in real time. Advantageously, this may reduce the processing overhead at the transmitter. Consequently, savings in power consumption and processing time during transmission may result, thereby improving communication performance.

In some aspects, a base station may allocate a set of transmission tones that includes a set of data tones and a set of PRTs to a UE. The set of transmission tones may indicate a set of PRT locations arranged relative to a set of data tone locations according to a PRT subsequence of a universal PRT sequence associated with a particular bandwidth. The PRT subsequence may correspond to a sub-band of the bandwidth associated with a resource allocation. In some aspects, UEs may be able to use all of the PRT tones in the universal PRT sequence.

In view of the above, aspects described herein may provide for an efficient PRT selection scheme that enables a UE to determine the PRT locations with reduced processing overhead and reduced signaling overhead. In some aspects, multiple PRT sequences, PRT subsequences, or other similar techniques may be used. These different techniques may have varying power constraints. A base station may be able to sweep the PRT sequences and/or instruct a UE to perform rate matching around one or more of the PRT subsequences, PRT sequences, etc. Consequently, transmission collisions may be reduced without excessive signaling overhead.

Tone reservation may be performed by determining PRTs that are configured to reduce peaks of the resulting OFDM signal so that the PAPR of the resulting signal satisfies a threshold. PRTs may be generated using a signal to clipping noise ratio tone reservation (SCR-TR) algorithm. The SCR-TR algorithm may be used to optimize the value of PRT tones based at least in part on their locations. Other PRT-based algorithms may be used in other examples.

A UE may be allocated a set of N transmission tones having a corresponding set of tone location indices, $\{1, \ldots, N\}$. If $\Phi$ is a subset of $\{1, \ldots, N\}$ corresponding to the PRT locations. The remaining transmission tone locations may be allocated to data tones, having a subset, $\{1, \ldots, N\}\backslash\Phi$, of tone location indices. A frequency domain kernel, $P_i$, may be constructed as shown in Equation 1:

$$P_i = \begin{cases} 1 & \text{if } i \in \Phi \\ 0 & \text{if } i \in [N]\backslash\Phi \end{cases} \quad \text{EQUATION 1}$$

Here, p=ifft(P). In addition, X may be the frequency domain data. Thus, $X_i=0$, if $i \in \Phi$. In addition, x=ifft(X).

If the location of the PRT is chosen properly and if the number of reserved tones is sufficiently large, the time-domain kernel p may take the form of a narrow delta. For example, the time-domain kernel p may correspond to the dashed line waveform 602 in the time-domain diagram 600 of FIG. 6. The solid line waveform 604 in FIG. 6 represents an example of a waveform for which the PAPR is to be reduced.

Figure 6:
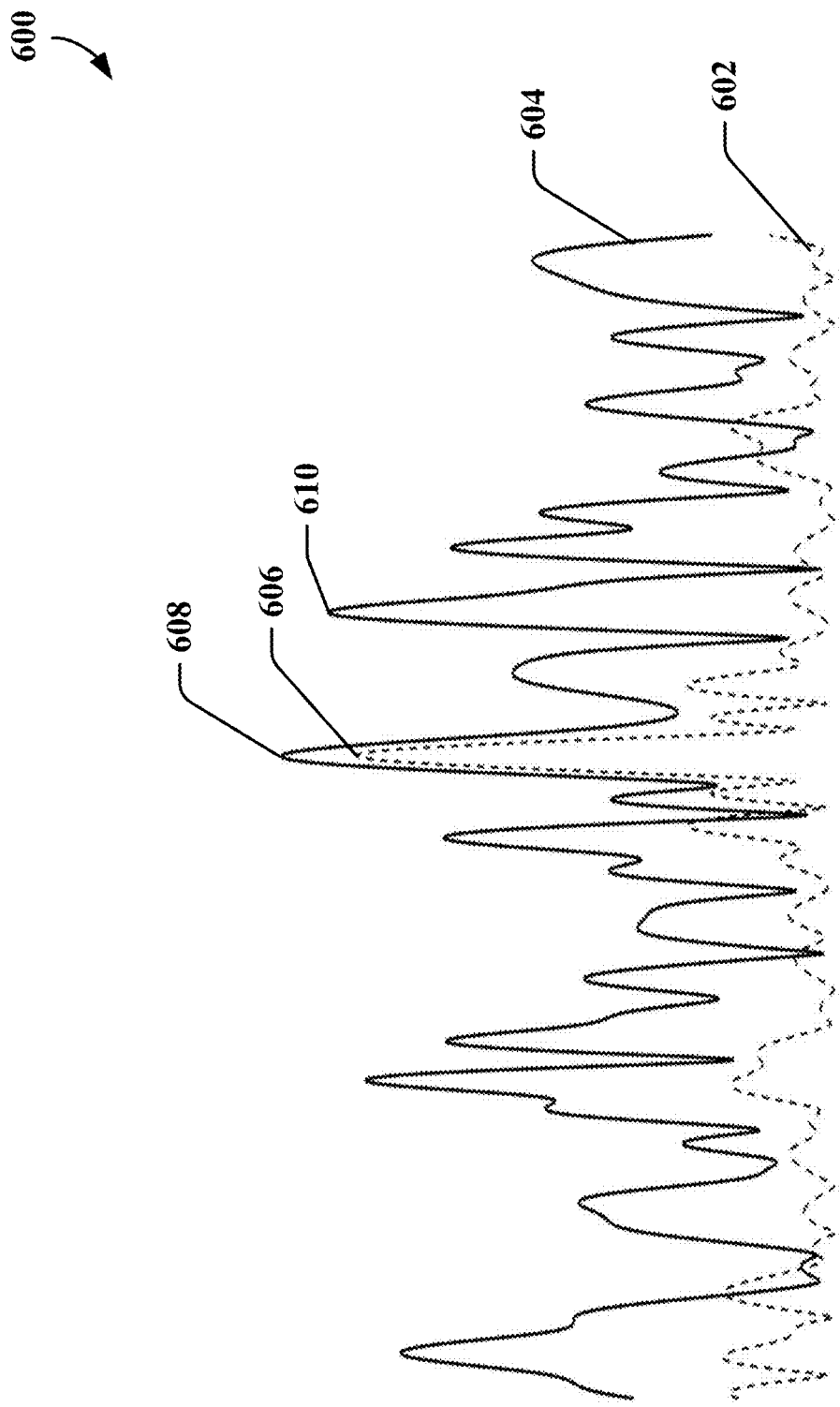
FIG. 6 is a conceptual illustration of an example of peak alignment according to some aspects.

A circular shift is performed on the kernel p so that the largest peak 606 of the kernel p is shifted to match up with the largest peak 608 of the data signal as shown in FIG. 6. Thus, the peak of the waveform may be reduced by subtracting the kernel p (with an appropriate scaling factor) from the data waveform.

In the next iteration of the algorithm (if applicable), another shift is done so that the largest peak 606 of the kernel p matches up with the largest peak of the modified waveform (i.e., after subtracting the kernel p from the waveform). For example, the peak 610 (the next largest peak of FIG. 6) may be the largest peak of the modified waveform. This process is repeated until the desired reduction in PAPR is obtained.

Circularly shifting p in the time-domain does not impact the location of PRTs in the frequency domain Rather, this circular shifting only disturbs the phase of the PRTs. Moreover, the circular shifting does not affect the data tones in the frequency domain Thus, the set of data tones and the set of PRTs remain disjoint.

According to the SCR-TR algorithm, the location of the largest peak of x is identified. Then, j (where $j \in [N]$) is used to represent the index of that location. The SCR-TR algorithm includes circularly shifting p (e.g., by the formula $p^i$=circshift(p,j)), so that the peaks are aligned. The SCR-TR algorithm further includes subtracting the scaled and shifted p from x as shown in Equation 2:

$$x_{new} = x - \frac{|x(j)| - \mu}{p(0)} p^j e^{i<x(j)} \quad \text{EQUATION 2}$$

Here x is the original waveform, $x_{new}$ is the new waveform, $\mu$ is the target peak, $<x(j)$ is the phase of $x(j)$, and $i=\sqrt{-1}$. This process may be iterated several times to reduce several peaks. The term $e^{i<x(j)}$ ensures that $p^j$ has the same phase as x at that particular location of the largest peak. The term $$\frac{|x(j)| - \mu}{p(0)}$$

is a scaling factor to ensure that the final value of the peak will be equal to $\mu$.

Figure 5:
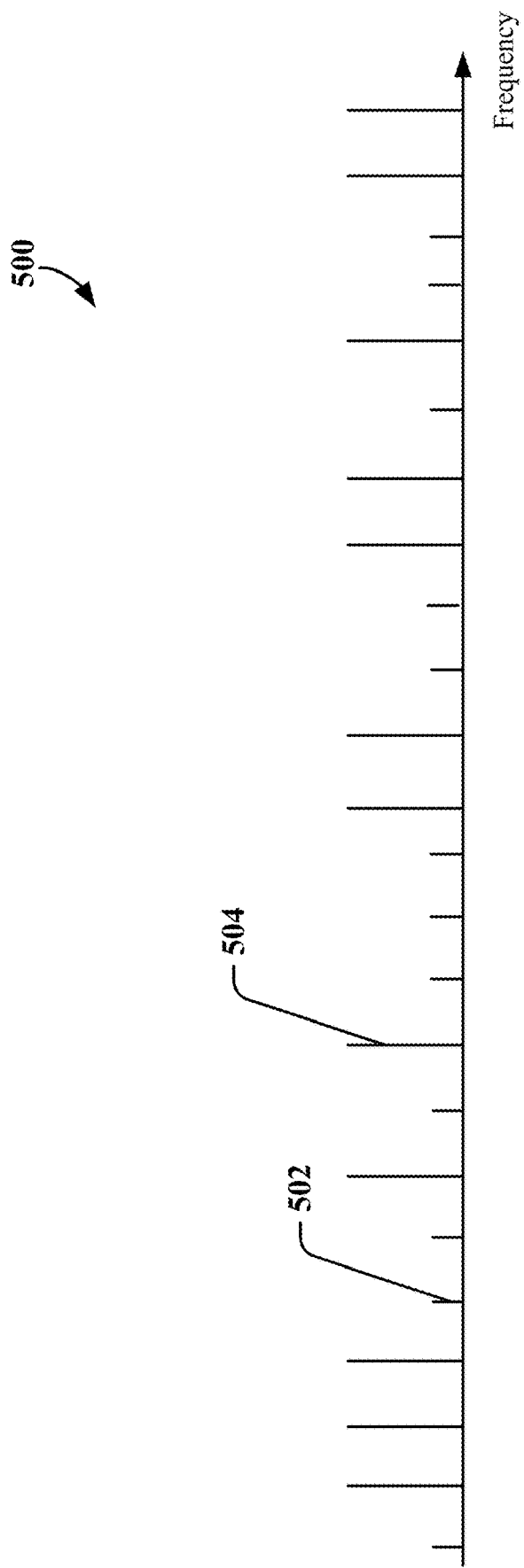
FIG. 5 is a conceptual illustration of an example peak reduction tone (PRT) sequence according to some aspects.

After generating a waveform with the desired PAPR, a UE may transmit the waveform to a base station. The base station may then set all of the PRT locations for the PRT sequence (e.g., as shown in FIG. 5) to zero to recreate the original waveform.

Figure 7:
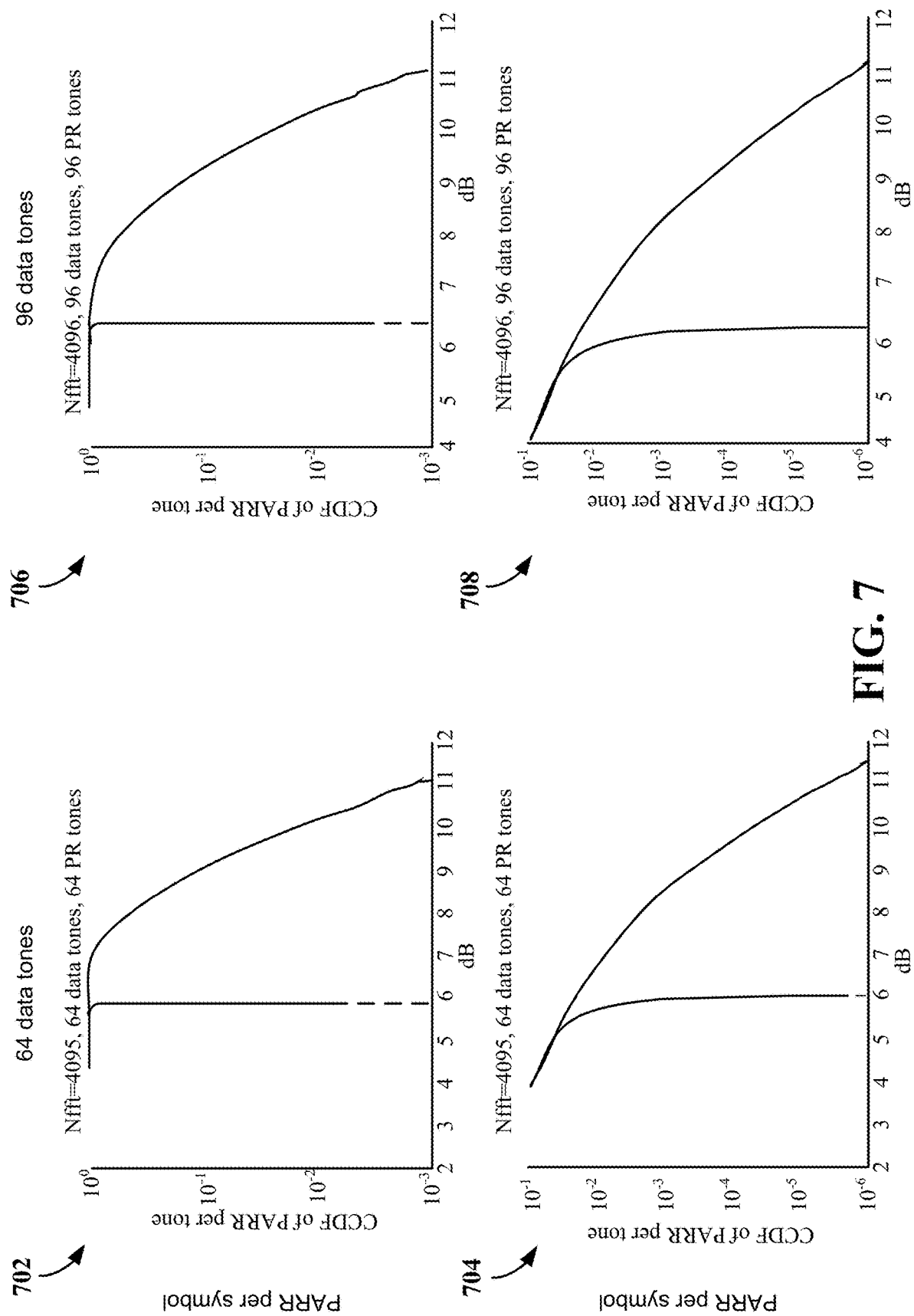
FIG. 7 is a conceptual illustration of an example of PRT-based peak to average power ratio (PAPR) reduction according to some aspects.

FIG. 7 illustrates several examples of PAPR reduction that may be achieved through the use of tone reservation. The curves on the left hand side of each graph represent the PAPR after running the algorithm (e.g., the PAPR is reduced to approximately 6 dB in each graph). Graphs 702 and 704 illustrate examples for 64 data tones. Graphs 706 and 708 illustrate examples for 96 data tones.

The disclosure relates in some aspects to using PRT resource allocation for a supplementary uplink (SUL). In 5G NR, conventional carriers can be paired with lower frequency carriers known as SUL carriers for coverage enhancement. In an SUL scheme (e.g., in contrast with a carrier aggregation scheme), a UE can transmit on either the SUL carrier or the non-SUL carrier (e.g., the main/conventional carrier). In some examples, the SUL carrier may use a frequency band that is in a frequency range similar to frequency bands used for 4G wireless communication (e.g., below 3 GHz).

An SUL carrier typically provides better coverage compared to a non-SUL carrier (e.g. due to the lower path loss at lower frequencies). Also, the use of an SUL carrier may improve diversity. Thus, a UE may use an SUL carrier, for example, in a coverage limited scenario. Here, the UE may switch from a higher frequency band primary carrier (e.g., a 5G NR carrier) to a lower frequency band SUL carrier which may provide better coverage than the primary carrier. In contrast, if there is not a coverage issue, the UE may stay with the primary carrier (e.g., which may support a higher data rate).

By using PRTs for an SUL carrier, the transmit power on the SUL may be increased (e.g., by reducing the PAPR and enabling operation closer to the saturation point of the transmit power amplifier). Thus, the coverage of the UE on the SUL carrier may be improved.

The disclosure relates in some aspects to using different PRT sequences (e.g., two or more PRT sequences) for different carriers (e.g., two or more carriers). Depending on which carrier is active, the corresponding PRT sequence will be used. The PRT sequence for each carrier is a subset of the available tones within that carrier.

In some examples, (e.g., where a UE needs to improve its coverage), there may be a PRT sequence for the SUL carrier only. That is, PRTs might not be used in the non-SUL carrier (e.g., so that all of the tones may be used for data). In this case, a PRT sequence might not be defined or might not be used for the non-SUL carrier. As one example, a base station may send a message (e.g., a radio resource control (RRC) configuration message) to the UE instructing the UE to only activate the PRT sequence for the SUL carrier. In this case, the UE may be configured to not activate the PRT sequence for the non-SUL carrier. As another example, a UE may elect (e.g., autonomously elect) to only activate the PRT sequence for the SUL carrier.

In some examples, PRT sequences may be defined and used for both an SUL carrier and a non-SUL carrier. This scheme may be used, for example, to improve spectral efficiency.

A decision by a base station or a UE regarding whether to activate PRTs for a non-SUL carrier may be based on traffic or other factors. For example, if the base station or UE determines that a relatively large number of UEs are transmitting on the same time resources and the UEs are frequency division multiplexed, the base station or the UE may determine that the frequency resources are relatively scarce. In this case, the base station or the UE may elect to not use PRTs (or use fewer PRTs) on the on-SUL carrier so that most or all of the tones are used for transmitting data.

Figure 8:
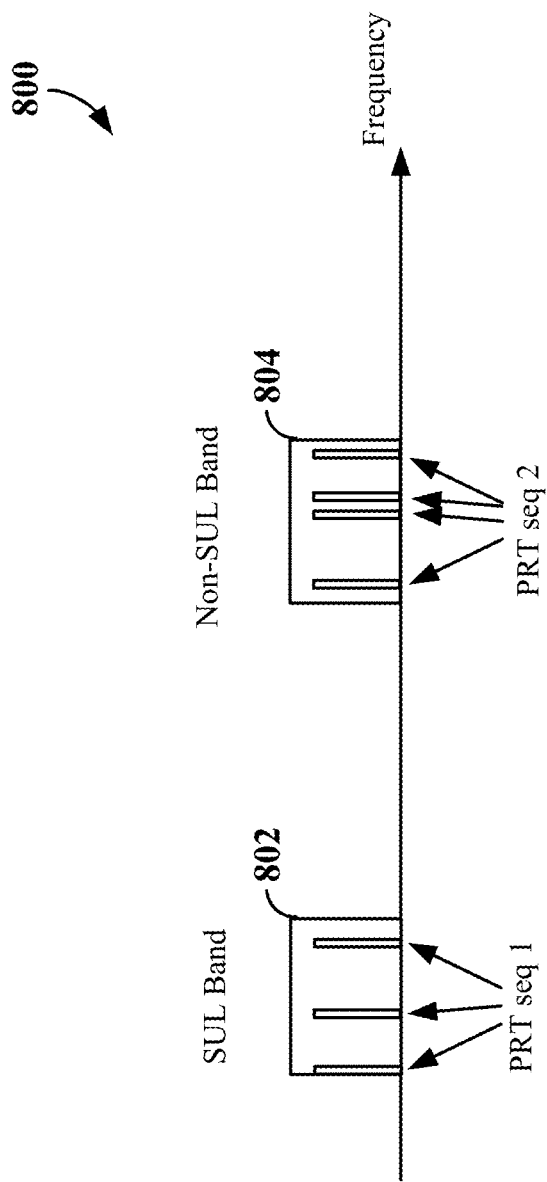
FIG. 8 is a conceptual illustration of an example of signaling PRT sequences for a supplementary uplink (SUL) and a non-SUL according to some aspects.

FIG. 8 is a frequency domain diagram 800 illustrating a first PRT sequence (PRT seq 1) defined for an SUL carrier associated with a first frequency band 802 and a second PRT sequence (PRT seq 2) defined for an SUL carrier associated with a second frequency band 804. In some examples, placing the set of PRTs close to the set of data tones may provide optimal performance Thus, different PRT sequences may be defined for different frequency bands (e.g., if the frequency bands are not close to each other).

The PRT densities for the two carriers may be different in some scenarios. For example, the PRT density for an SUL carrier may be higher than the PRT density for a non-SUL carrier since the SUL carrier will typically be activated in a coverage limited scenario and more PRTs may provide a lower PAPR. In contrast, a non-SUL carrier may be used when coverage is not limited and, thus, it may be more advantageous to use all of the tones for transmitting data in this case. In contrast, for other scenarios (e.g., when PRTs are used to improve spectral efficiency), the PRT densities for the two carriers may be similar.

Figure 9:
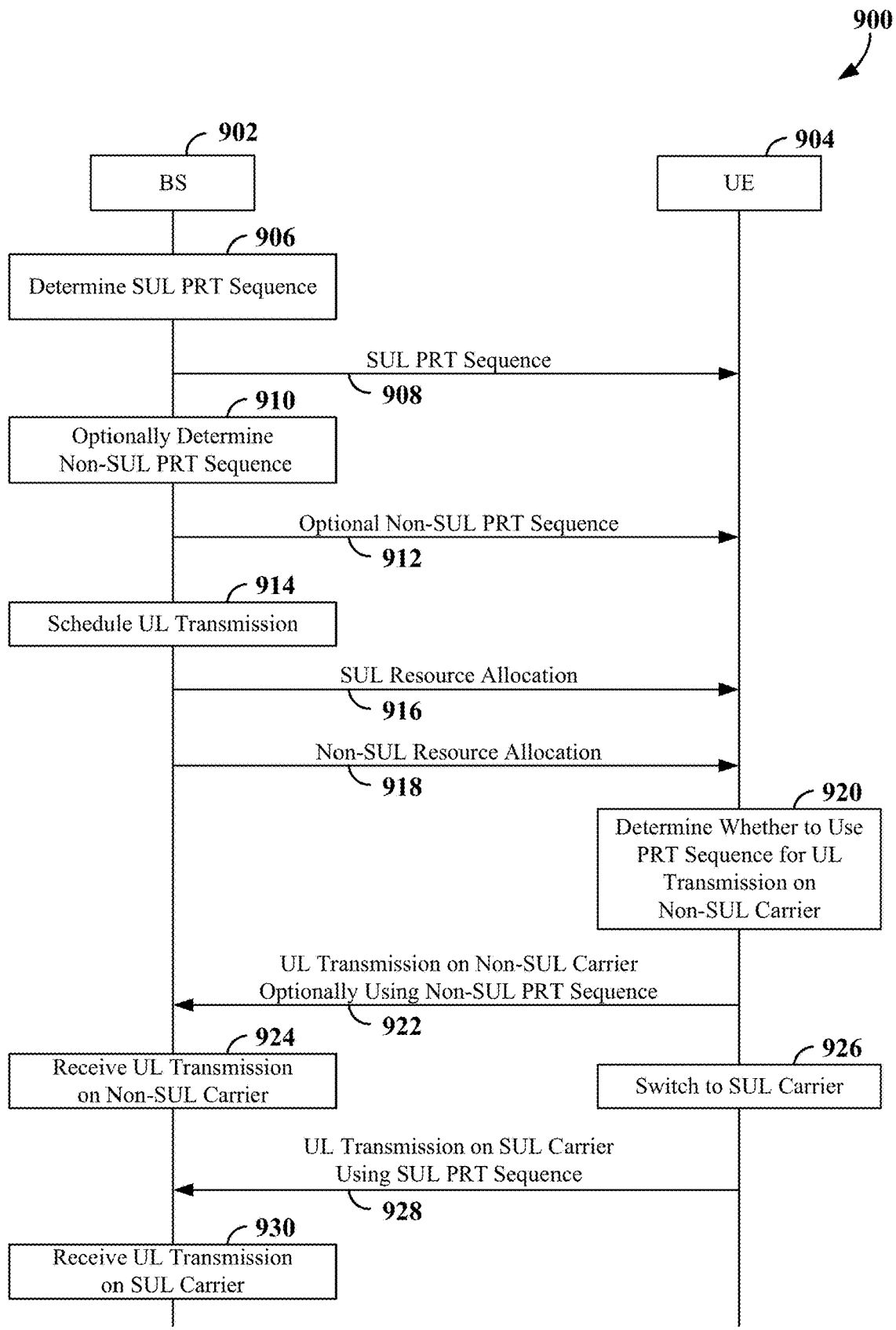
FIG. 9 is a signaling diagram illustrating an example of PRT-related signaling between a user equipment and a base station according to some aspects.

FIG. 9 illustrates an example of signaling 900 in a wireless communication network including a base station (BS) 902 and a user equipment (UE) 904. In some examples, the BS 902 may correspond to any of the BSs or scheduling entities shown in any one or more of FIGS. 1, 2, and 13. In some examples, the UE 904 may correspond to any of the UEs or scheduled entities shown in any one or more of FIGS. 1, 2, and 10.

At 906 of FIG. 9, the BS 902 determines an SUL PRT sequence. For example, the BS 902 may generate a PRT sequence for a particular SUL frequency band (e.g., using the PRT sequence generation techniques described herein). As another example, the BS 902 may select a PRT sequence from a set of PRT sequences that have been predefined (e.g., by a wireless communication standard or in some other manner). For example, different sets of PRT sequences may be predefined for different frequency bands. In some cases, a table may be defined that includes an entry for each of the predefined PRT sequences. Thus, the base station may select the predefined PRT sequence (e.g., select the corresponding index into the table) that corresponds to (e.g., is the closest match to) the frequency band of the SUL. Other PRT sequence determining techniques may be used in other examples.

At 908, the BS 902 transmits an indication of the PRT sequence to be used for the SUL carrier to the UE 904. For example, the BS 902 may transmit an RRC configuration message or a grant in a DCI message that includes an indication of the PRT sequence.

In some examples, the PRT sequence to be used (e.g., the PRT sequence determined at 906) may depend on a data rate, a size of a BWP, and/or other factors. Thus, 908 may include the BS 902 transmitting a new indication of the PRT sequence to be used (e.g., in a DCI message) whenever a resource allocation or other scheduling changes.

At optional 910, the BS 902 may determine a non-SUL PRT sequence. For example, the BS 902 may generate a PRT sequence for a particular NR carrier frequency band (e.g., using the PRT sequence generation techniques described herein). As another example, the BS 902 may select a PRT sequence from a set of PRT sequences that have been predefined (e.g., by a wireless communication standard or in some other manner). For example, different sets of PRT sequences may be predefined for different frequency bands. Thus, the base station may select the predefined PRT sequence that corresponds (e.g., is the closest match to) the frequency band of the NR carrier. Other PRT sequence determining techniques may be used in other examples.

At optional 912, the BS 902 may transmit an indication of the PRT sequence to be used for the non-SUL carrier to the UE 904. For example, the BS 902 may transmit an RRC configuration message or a grant in a DCI message that includes an indication of the PRT sequence.

In some examples, the PRT sequence to be used (e.g., the PRT sequence determined at 910) may depend on a data rate, a size of a BWP, and/or other factors. Thus, 912 may include the BS 902 transmitting a new indication of the PRT sequence to be used (e.g., in a DCI message) whenever a resource allocation or other scheduling changes.

At 914, the BS 902 schedules the UE 904 for an UL transmission. For example, the BS 902 may schedule resources on an NR carrier and on an SUL carrier.

At 916, the BS 902 transmits an indication of the SUL resource allocation to the UE 904. In some examples, this resource allocation may be based on the SUL PRT sequence determined at 906.

At 918, the BS 902 transmits an indication of the non-SUL resource allocation to the UE 904. In some examples, this resource allocation may be based on the non-SUL PRT sequence determined at 910.

At 920, the UE 904 determines whether to use a PRT sequence for an UL transmission on a non-SUL carrier. For example, the BS 902 may have previously indicated to the UE 904 that PRTs are not to be used on the non-SUL carrier. This indication may be explicit (e.g., an indication in an RRC message) or implicit (e.g., the base station sends the SUL PRT sequence but not the non-SUL PRT sequence to the UE 904). In some examples, if the BS 902 detects a high traffic load (e.g., above a threshold) on the non-SUL carrier, the BS 902 may elect to avoid using PRTs in the non-SUL carrier. As another example, the UE 904 may autonomously determine whether PRTs are to be used on the non-SUL carrier (e.g., based on UE traffic).

At 922, the UE 904 transmits a data transmission on the non-SUL carrier. This transmission might or might not be based on a non-SUL PRT sequence according to the determination of 920.

At 924, the BS 902 receives the data transmission on the non-SUL carrier. Here, the decoding of the data transmission may be based on the non-SUL PRT sequence as applicable.

At 926, at some point in time, the UE 904 may switch to an SUL carrier for UL transmission. For example, if the UE 904 detects a coverage limited scenario, the UE 904 may switch to the lower frequency SUL carrier which may provide better coverage than the non-SUL carrier.

At 928, the UE 904 transmits a data transmission on the SUL carrier. This transmission may be based on a PRT sequence as discussed herein.

At 930, the BS 902 receives the data transmission on the SUL carrier. Here, the decoding of the data transmission may be based on the SUL PRT sequence as discussed herein.

Figure 10:
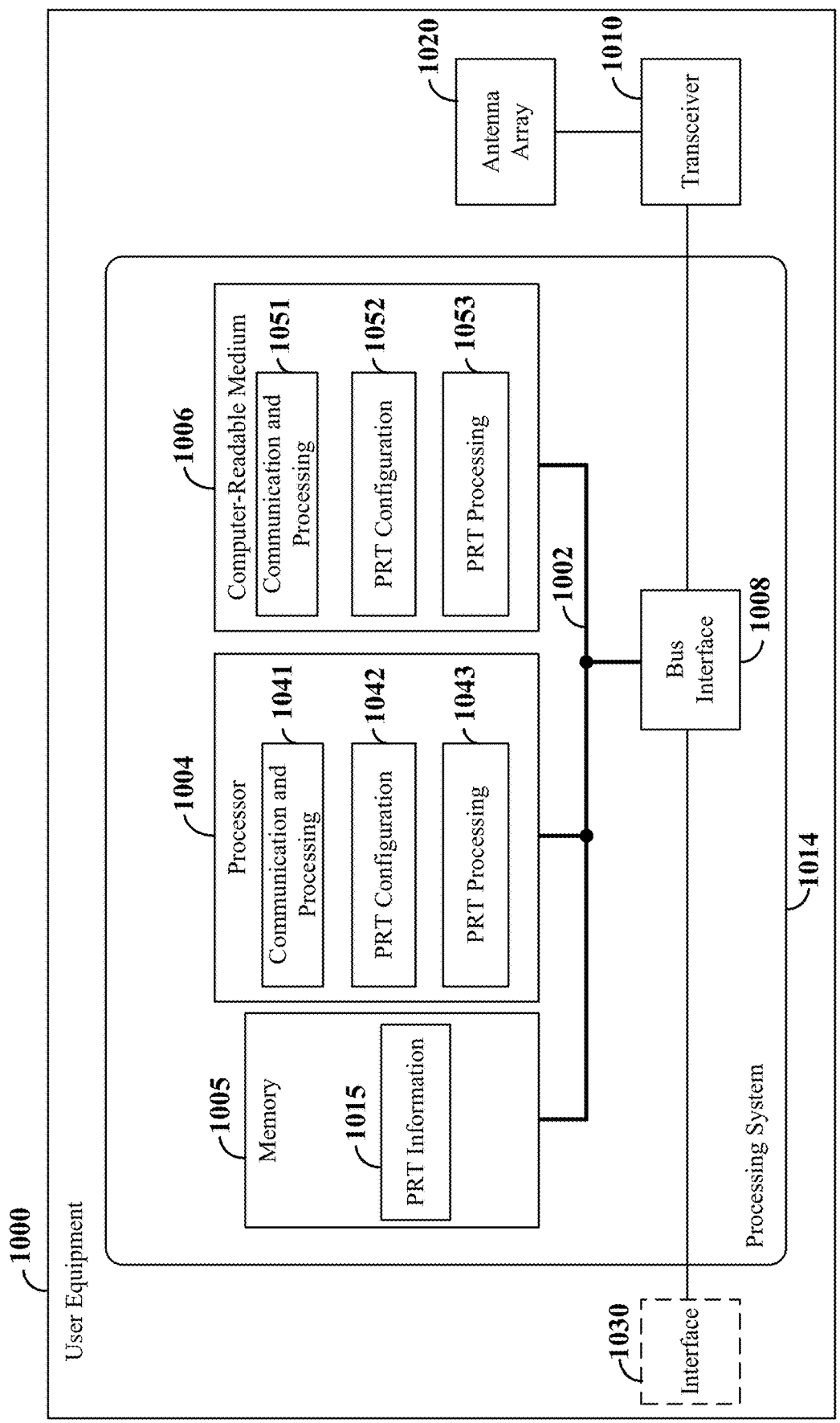
FIG. 10 is a block diagram illustrating an example of a hardware implementation for a user equipment employing a processing system according to some aspects.

FIG. 10 is a block diagram illustrating an example of a hardware implementation for a UE 1000 employing a processing system 1014. For example, the UE 1000 may be a 5G UE or other device configured to wirelessly communicate with a base station, as discussed in any one or more of FIGS. 1-9. In some implementations, the UE 1000 may correspond to any of the UEs or scheduled entities shown in any one or more of FIGS. 1, 2, and 9.

In accordance with various aspects of the disclosure, an element, or any portion of an element, or any combination of elements may be implemented with the processing system 1014. The processing system 1014 may include one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described herein.

The processor 1004 may in some instances be implemented via a baseband or modem chip and in other implementations, the processor 1004 may itself comprise a number of devices distinct and different from a baseband or modem chip (e.g., in such scenarios as may work in concert to achieve examples as discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and an antenna array 1320, and an interface between the bus 1002 and an interface 1030. The transceiver 1010 provides a communication interface or means for communicating with various other apparatus over a wireless transmission medium. The interface 1030 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1030 may include a user interface (e.g., keypad, display, speaker, microphone, joystick). Of course, such a user interface is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store PRT information 1015 used by the processor 1004 for communication operations as described herein.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. For example, the memory 1305 may store PRT information 1315 used by the processor 1304 for communication operations as described herein.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1000 may be configured to perform any one or more of the operations described herein (e.g., as described above in conjunction with FIGS. 1-9 and as described below in conjunction with FIG. 11). In some aspects of the disclosure, the processor 1004, as utilized in the UE 1000, may include circuitry configured for various functions.

The processor 1004 may include communication and processing circuitry 1041. The communication and processing circuitry 1041 may be configured to communicate with a base station, such as a gNB. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various processes related to signal processing (e.g., processing a received signal and/or processing a signal for transmission) as described herein. In some examples, the communication and processing circuitry 1041 may include two or more transmit/receive chains, each configured to process signals in a different RAT (or RAN) type. The communication and processing circuitry 1041 may further be configured to execute communication and processing software 1051 included on the computer-readable medium 1006 to implement one or more functions described herein.

In some examples, the communication and processing circuitry 1041 may be configured to generate and transmit a scheduling request (e.g., via UCI in a PUCCH) to the base station to receive an uplink grant for the PUSCH. The communication and processing circuitry 1041 may further be configured to generate an uplink signal and interact with the transceiver 1010 to transmit the uplink signal. The uplink signal may include, for example, a PUCCH, a PUSCH, an SRS, a DMRS, or a physical random access channel (PRACH). The communication and processing circuitry 1041 may further be configured to interact with the transceiver 1010 to monitor for a downlink signal and decode a downlink signal. The downlink signal may include, for example, a PDCCH, a PDSCH, a CSI-RS, or a DMRS.

In some implementations where the communication involves receiving information, the communication and processing circuitry 1041 may obtain information from a component of the UE 1000 (e.g., from the transceiver 1010 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1005, or to the bus interface 1008. In some examples, the communication and processing circuitry 1041 may receive one or more of signals, messages, other information, or any combination thereof. In some examples, the communication and processing circuitry 1041 may receive information via one or more channels. In some examples, the communication and processing circuitry 1041 may include functionality for a means for receiving. In some examples, the communication and processing circuitry 1041 may include functionality for a means for decoding.

In some implementations where the communication involves sending (e.g., transmitting) information, the communication and processing circuitry 1041 may obtain information (e.g., from another component of the processor 1004, the memory 1005, or the bus interface 1008), process (e.g., encode) the information, and output the processed information. For example, the communication and processing circuitry 1041 may output the information to the transceiver 1010 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., means for transmitting). In some examples, the communication and processing circuitry 1041 may include functionality for a means for encoding.

The processor 1004 may include PRT configuration circuitry 1042 configured to perform PRT configuration-related operations as discussed herein (e.g., in conjunction with FIGS. 8 and 9). The PRT configuration circuitry 1042 may be configured to execute PRT configuration software 1052 included on the computer-readable medium 1006 to implement one or more functions described herein.

The PRT configuration circuitry 1042 may include functionality for a means for receiving a resource allocation. For example, the PRT configuration circuitry 1042 may be configured to may monitor a PDCCH channel for a DCI that indicates at least one resource allocated for an uplink transmission (e.g., on a PUSCH).

The PRT configuration circuitry 1042 may include functionality for a means for determining a PRT sequence. For example, the PRT configuration circuitry 1042 may be configured to monitor a PDCCH or some other channel for a DCI or some other message that includes the at least one indication of at least one PRT sequence.

The processor 1004 may include PRT processing circuitry 1043 configured to perform PRT processing-related operations as discussed herein (e.g., in conjunction with FIGS. 8 and 9). The PRT processing circuitry 1043 may be configured to execute PRT processing software 1053 included on the computer-readable medium 1006 to implement one or more functions described herein.

The PRT processing circuitry 1043 may include functionality for a means for generating a waveform. For example, the PRT processing circuitry 1043 may be configured to generate a first data transmission based on a first PRT sequence.

The PRT processing circuitry 1043 may include functionality for a means for transmitting a data transmission (e.g., a data transmission including a waveform based on a PRT sequence). For example, the PRT processing circuitry 1043 may be configured to transmit a first data transmission on an uplink channel (e.g., on a PUSCH) of the SUL carrier.

Figure 11:
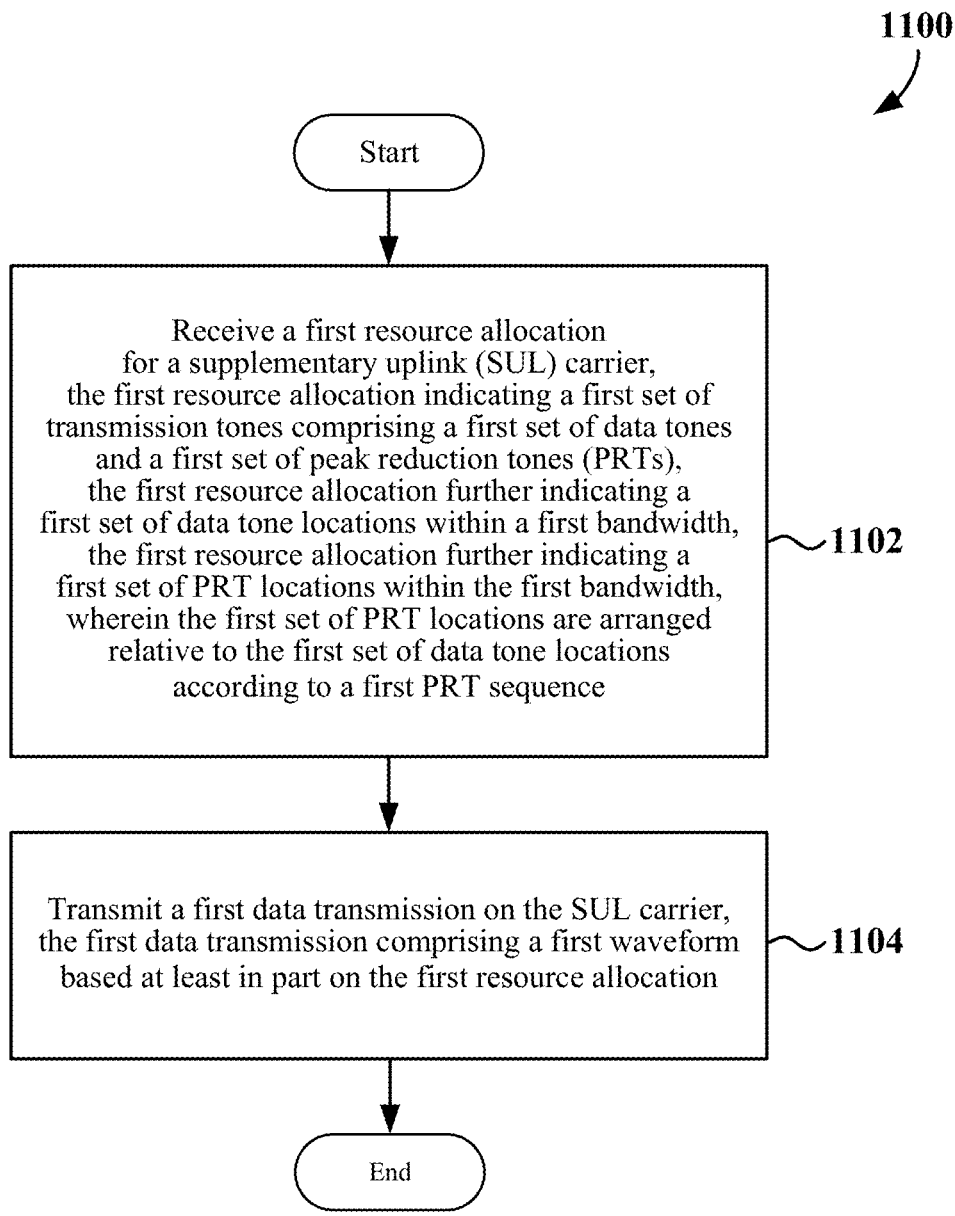
FIG. 11 is a flow chart of an example method for transmitting on an SUL carrier according to some aspects.

FIG. 11 is a flow chart illustrating an example wireless communication method 1100 in accordance with some aspects of the disclosure. As described below, some or all illustrated features may be omitted in a particular implementation within the scope of the present disclosure, and some illustrated features may not be required for implementation of all examples. In some examples, the wireless communication method 1100 may be carried out by the UE 1000 illustrated in FIG. 10. In some examples, the wireless communication method 1100 may be carried out by any suitable apparatus or means for carrying out the functions or algorithm described below.

At block 1102, a user equipment may receive a first resource allocation for a supplementary uplink (SUL) carrier, the first resource allocation indicating a first set of transmission tones including a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence. For example, the PRT configuration circuitry 1042 together with the communication and processing circuitry 1041 and the transceiver 1010, shown and described above in connection with FIG. 10, may provide a means to receive a first resource allocation for a supplementary uplink (SUL) carrier.

In some examples, the first resource allocation may include an indication of the first PRT sequence. In some examples, the method may further include determining the first PRT sequence from the indication. In some examples, the indication may include a bit mask that indicates a first location of each of one or more PRTs of the first set of PRTs relative to a second location of each of one or more data tones of the first set of data tones.

In some examples, the indication may include an index for a PRT table and the PRT table indicates the first PRT sequence and a second PRT sequence. In some examples, the PRT table may include a plurality of entries, wherein an entry of the plurality of entries may include at least one of the first PRT sequence, one or more parameters of a deterministic function for determining the first PRT sequence, a starting index associated with the first PRT sequence, an ending index associated with the first PRT sequence, or a combination thereof.

At block 1104, the user equipment may transmit a first data transmission on the SUL carrier, the first data transmission including a first waveform based at least in part on the first resource allocation. For example, the PRT processing circuitry 1043, shown and described above in connection with FIG. 10, may generate the first data transmission based on the first PRT sequence. In addition, the PRT processing circuitry 1043 together with the communication and processing circuitry 1041 and the transceiver 1010, shown and described above in connection with FIG. 10, may provide a means to transmit a first data transmission on the SUL carrier.

In some examples, the user equipment may receive a second resource allocation for a second uplink carrier different from the SUL carrier, the second resource allocation indicating a second set of transmission tones, and transmit a second data transmission on the second uplink carrier using a second waveform based at least in part on the second resource allocation. In some examples, the SUL carrier is associated with a first frequency band, the second uplink carrier is associated with a second frequency band, and the first frequency band is lower in frequency than the second frequency band. In some examples, the second uplink carrier is a Third Generation Partnership Project (3GPP) 5G New Radio (NR) carrier.

In some examples, the user equipment may receive an indication to exclusively use the first PRT sequence. In some examples, the user equipment may abstain from generating the second waveform using a second PRT sequence after receiving the indication to exclusively use the first PRT sequence.

In some examples, the user equipment may receive an indication of a coverage limited condition for the user equipment. In some examples, the user equipment may abstain from generating the second waveform using a second PRT sequence after receiving the indication of the coverage limited condition for the user equipment.

In some examples, the second set of transmission tones may include a second set of data tones and a second set of peak reduction tones (PRTs), the second resource allocation further indicating a second set of data tone locations within a second bandwidth, the second resource allocation further indicating a second set of PRT locations within the second bandwidth, wherein the second set of PRT locations are arranged relative to the second set of data tone locations according to a second PRT sequence. In some examples, the second resource allocation may include an indication of the second PRT sequence. In some examples, the user equipment may determine the second PRT sequence from the indication. In some examples, the indication may include an index for a PRT table, and the PRT table indicates the first PRT sequence and the second PRT sequence.

In some examples, the first set of transmission tones may be associated with a first density of the first set of PRTs relative to the first set of data tones. The second set of transmission tones may be associated with a second density of the second set of PRTs relative to the second set of data tones. The first density may be higher than the second density.

In some examples, the first set of PRTs are defined such that a first peak to average power ratio (PAPR) associated with the first waveform satisfies a first PAPR threshold. In some examples, the second set of PRTs are defined such that a second peak to average power ratio (PAPR) associated with the second waveform satisfies a second PAPR threshold.

In some examples, the user equipment may receive the first resource allocation and the second resource allocation from a base station via at least one downlink control information (DCI), at least one radio resource control (RRC) message, at least one medium access control-control element (MAC-CE), or a combination thereof.

In some examples, the user equipment may generate the first waveform by determining a first inverse discrete Fourier transform of the first set of transmission tones. The first waveform may include a first cyclic prefix orthogonal frequency division multiplexing (OFDM) waveform or a first discrete Fourier transform spread OFDM waveform.

In some examples, the user equipment may generate the second waveform by determining a second inverse discrete Fourier transform of the second set of transmission tones. The second waveform may include a second cyclic prefix orthogonal frequency division multiplexing (OFDM) waveform or a second discrete Fourier transform spread OFDM waveform.

Figure 12:
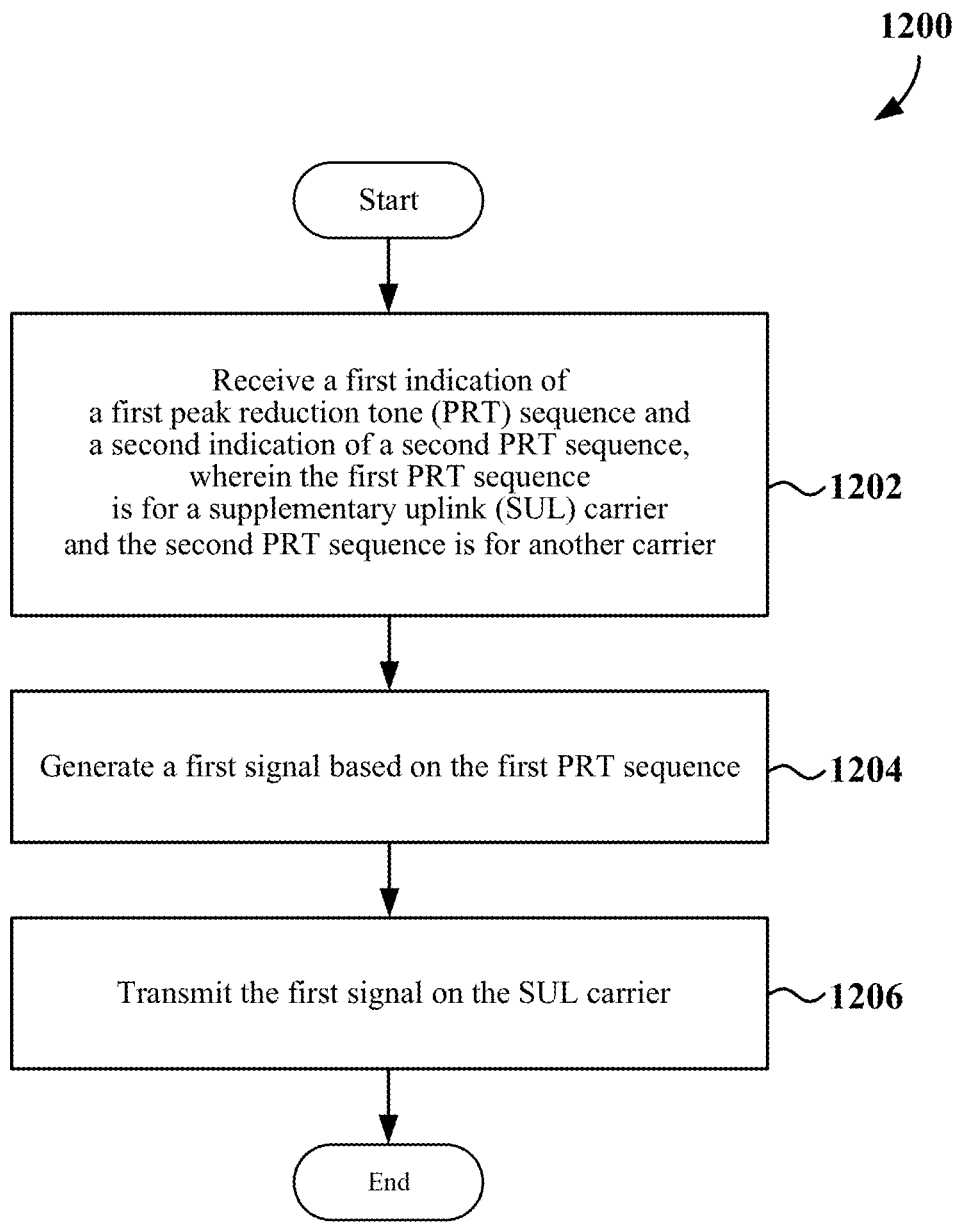
FIG. 12 is a flow chart of another example method for transmitting on an SUL carrier according to some aspects.

FIG. 12 is a flow chart illustrating an example wireless communication method 1200 in accordance with some aspects of the disclosure. As described below, some or all illustrated features may be omitted in a particular implementation within the scope of the present disclosure, and some illustrated features may not be required for implementation of all examples. In some examples, the wireless communication method 1200 may be carried out by the UE 1000 illustrated in FIG. 10. In some examples, the wireless communication method 1200 may be carried out by any suitable apparatus or means for carrying out the functions or algorithm described below.

At block 1202, a user equipment may receive a first indication of a first peak reduction tone (PRT) sequence and a second indication of a second PRT sequence, wherein the first PRT sequence is for a supplementary uplink (SUL) carrier and the second PRT sequence is for another carrier. For example, the PRT configuration circuitry 1042 together with the communication and processing circuitry 1041 and the transceiver 1010, shown and described above in connection with FIG. 10, may provide a means to receive a first indication of a first peak reduction tone (PRT) sequence and a second indication of a second PRT sequence.

The first indication may include a first index for a PRT table. The second indication may include a second index for the PRT table. The PRT table may indicate (e.g., include entries for) the first PRT sequence and the second PRT sequence.

At block 1204, the user equipment may generate a first signal based on the first PRT sequence. For example, the PRT processing circuitry 1043, shown and described above in connection with FIG. 10, may provide a means to generate a first signal based on the first PRT sequence.

At block 1206, the user equipment may transmit the first signal on the SUL carrier. For example, the PRT processing circuitry 1043 together with the communication and processing circuitry 1041 and the transceiver 1010, shown and described above in connection with FIG. 10, may provide a means to transmit the first signal on the SUL carrier.

In some examples, the user equipment may generate a second signal based on the second PRT sequence. In some examples, the user equipment may transmit the second signal on the other carrier. In some examples, the user equipment may receive a first resource allocation. The first resource allocation may include the first indication of the first PRT sequence. In some examples, the user equipment may determine the first PRT sequence from the first indication.

In some examples, the user equipment may receive a second resource allocation. The second resource allocation may include the second indication of the second PRT sequence. In some examples, the method may further include determining the second PRT sequence from the second indication.

In one configuration, the UE 1000 includes means for receiving a first resource allocation for a supplementary uplink (SUL) carrier, the first resource allocation indicating a first set of transmission tones comprising a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence, and means for transmitting a first data transmission on the SUL carrier, the first data transmission comprising a first waveform based at least in part on the first resource allocation. In one aspect, the aforementioned means may be the processor 1004 shown in FIG. 14 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable medium 1006, or any other suitable apparatus or means described in any one or more of FIGS. 1, 2, 9, and 10, and utilizing, for example, the methods and/or algorithms described herein in relation to FIGS. 11 and 12.

Figure 13:
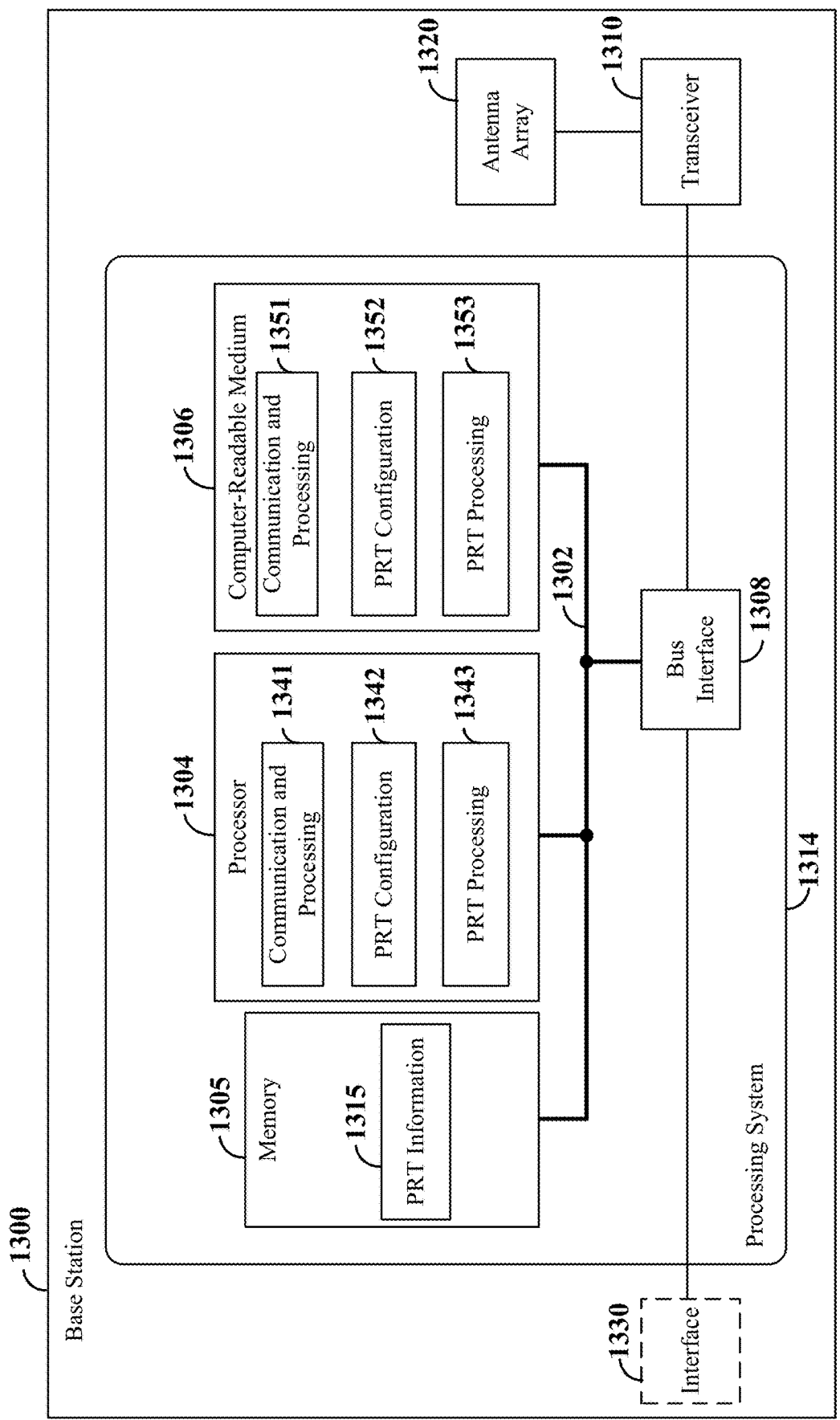
FIG. 13 is a block diagram illustrating an example of a hardware implementation for a base station employing a processing system according to some aspects.

FIG. 13 is a conceptual diagram illustrating an example of a hardware implementation for base station (BS) 1300 employing a processing system 1314. In some implementations, the BS 1300 may correspond to any of the BSs (e.g., gNBs) or scheduling entities shown in any one or more of FIGS. 1, 2, and 9.

In accordance with various aspects of the disclosure, an element, or any portion of an element, or any combination of elements may be implemented with the processing system 1314. The processing system may include one or more processors 1304. The processing system 1314 may be substantially the same as the processing system 1014 illustrated in FIG. 10, including a bus interface 1308, a bus 1302, memory 1305, a processor 1304, and a computer-readable medium 1306. For example, the memory 1305 may store PRT information 1315 used by the processor 1304 for communication operations as described herein. Furthermore, the BS 1300 may include an interface 1330 (e.g., a network interface) that provides a means for communicating with at least one other apparatus within a core network and with at least one radio access network.

The BS 1300 may be configured to perform any one or more of the operations described herein (e.g., as described above in conjunction with FIGS. 1-9 and as described below in conjunction with FIGS. 14 and 15). In some aspects of the disclosure, the processor 1304, as utilized in the BS 1300, may include circuitry configured for various functions.

The processor 1304 may be configured to generate, schedule, and modify a resource assignment or grant of time-frequency resources (e.g., a set of one or more resource elements). For example, the processor 1304 may schedule time-frequency resources within a plurality of time division duplex (TDD) and/or frequency division duplex (FDD) subframes, slots, and/or mini-slots to carry user data traffic and/or control information to and/or from multiple user equipment.

The processor 1304 may be configured to schedule resources for the transmission of a downlink signal. The downlink signal may include, for example, a PDCCH, a PDSCH, a CSI-RS, or a DMRS. The processor 1304 may further be configured to schedule resources that may be utilized by a user equipment to transmit an uplink signal. The uplink signal may include, for example, a PUCCH, a PUSCH, an SRS, a DMRS, or a PRACH.

In some aspects of the disclosure, the processor 1304 may include communication and processing circuitry 1341. The communication and processing circuitry 1344 may be configured to communicate with a user equipment. The communication and processing circuitry 1341 may include one or more hardware components that provide the physical structure that performs various processes related to communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. The communication and processing circuitry 1341 may further be configured to execute communication and processing software 1351 included on the computer-readable medium 1306 to implement one or more functions described herein. The communication and processing circuitry 1341 may further be configured to interact with the transceiver 1310 to encode and transmit a downlink signal. The communication and processing circuitry 1341 may further be configured to interact with the transceiver 1310 to monitor for and decode an uplink signal.

In some implementations where the communication involves receiving information, the communication and processing circuitry 1341 may obtain information from a component of the BS 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving. In some examples, the communication and processing circuitry 1341 may include functionality for a means for decoding.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., means for transmitting). In some examples, the communication and processing circuitry 1341 may include functionality for a means for encoding.

The processor 1304 may include PRT configuration circuitry 1342 configured to perform PRT configuration-related operations as discussed herein (e.g., in conjunction with FIGS. 8 and 9). The PRT configuration circuitry 1342 may be configured to execute PRT configuration software 1352 included on the computer-readable medium 1306 to implement one or more functions described herein.

The PRT configuration circuitry 1342 may include functionality for a means for selecting a resource allocation. For example, the PRT configuration circuitry 1342 may be configured to schedule an uplink transmission using a first resource allocation. As another example, the PRT configuration circuitry 1342 may be configured to select PRT sequences to be used for the SUL carrier and the other carrier and determine an indicator for each PRT sequence (e.g., identify the indices into a table for the PRT sequences). In addition, the PRT configuration circuitry 1342 may be configured to or some other message that indicates each PRT sequence.

The PRT configuration circuitry 1342 may include functionality for a means for transmitting a resource allocation (e.g., a resource allocation that is based on a PRT sequence). For example, the PRT configuration circuitry 1342 may be configured to generate a DCI that indicates the first resource allocation and to transmit the DCI on a PDCCH. As another example, the PRT configuration circuitry 1342 may be configured to transmit a DCI (or some other message) that indicates at least one PRT sequence on a PDCCH (or some other channel).

The PRT configuration circuitry 1342 may include functionality for a means for determining whether a user equipment is to transmit without PRTs. For example, the PRT configuration circuitry 1342 may be configured to determine whether the tones for a non-SUL carrier should be scheduled without PRTs.

The PRT configuration circuitry 1342 may include functionality for a means for determining a coverage limited condition. For example, the PRT configuration circuitry 1342 may be configured to determine whether an amount of traffic scheduled to be transmitted on a resource of an uplink carrier exceeds a threshold.

The PRT configuration circuitry 1342 may include functionality for a means for transmitting an indication of whether a user equipment is to use a PRT sequence. For example, the PRT configuration circuitry 1342 may be configured to select PRT sequences to be used for the SUL carrier and the other carrier and determine an indicator for each PRT sequence (e.g., identify the indices into a table for the PRT sequences). In addition, the PRT configuration circuitry 1342 may be configured to or some other message that indicates each PRT sequence, and configured to transmit the DCI (or some other message) on a PDCCH (or some other channel).

The processor 1304 may include PRT processing circuitry 1343 configured to perform PRT processing-related operations as discussed herein (e.g., in conjunction with FIGS. 8 and 9). The PRT processing circuitry 1343 may be configured to execute PRT processing software 1353 included on the computer-readable medium 1306 to implement one or more functions described herein.

The PRT processing circuitry 1343 may include functionality for a means for receiving a data transmission (e.g., a data transmission including a waveform based on a PRT sequence). For example, the PRT processing circuitry 1343 may be configured to monitor a PDSCH channel and decode the data transmission (e.g., according to a PRT sequence).

Figure 14:
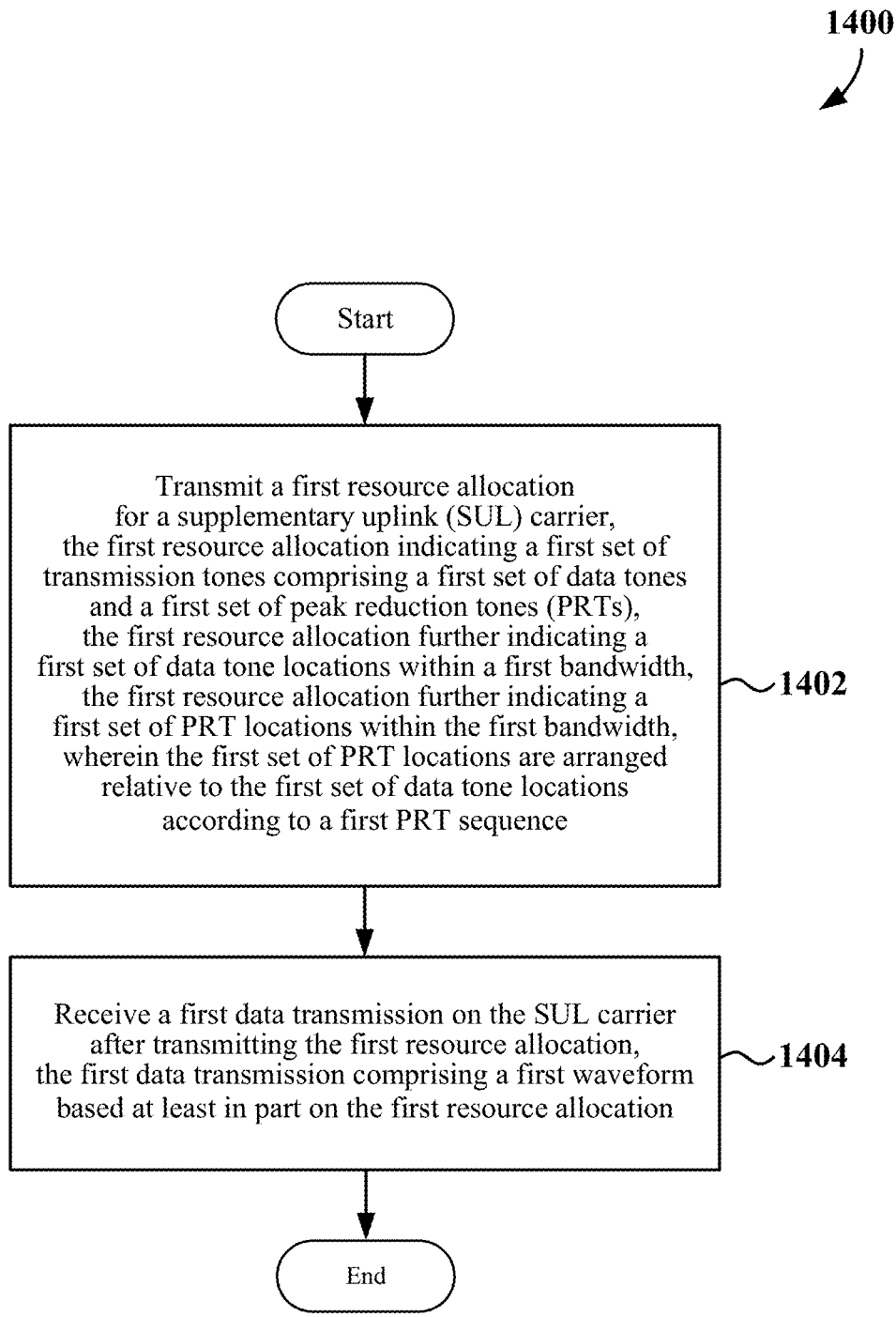
FIG. 14 is a flow chart of an example method for receiving on an SUL carrier according to some aspects.

FIG. 14 is a flow chart illustrating an example wireless communication method 1400 in accordance with some aspects of the disclosure. As described below, some or all illustrated features may be omitted in a particular implementation within the scope of the present disclosure, and some illustrated features may not be required for implementation of all examples. In some examples, the wireless communication method 1400 may be carried out by the BS 1300 illustrated in FIG. 13. In some examples, the wireless communication method 1400 may be carried out by any suitable apparatus or means for carrying out the functions or algorithm described below.

At block 1402, a base station may transmit a first resource allocation for a supplementary uplink (SUL) carrier, the first resource allocation indicating a first set of transmission tones including a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence. For example, the PRT configuration circuitry 1342 together with the communication and processing circuitry 1341 and the transceiver 1310, shown and described above in connection with FIG. 13, may provide a means to transmit a first resource allocation for a supplementary uplink (SUL) carrier.

In some examples, the first resource allocation may include an indication of the first PRT sequence. In some examples, the indication may include a bit mask that indicates a first location of each of one or more PRTs of the first set of PRTs relative to a second location of each of one or more data tones of the first set of data tones.

In some examples, the indication may include an index for a PRT table. In some examples, the PRT table indicates the first PRT sequence and a second PRT sequence.

In some examples, the PRT table may include a plurality of entries, wherein an entry of the plurality of entries may include at least one of the first PRT sequence, one or more parameters of a deterministic function for determining the first PRT sequence, a starting index associated with the first PRT sequence, an ending index associated with the first PRT sequence, or a combination thereof.

At block 1404, the base station may receive a first data transmission on the SUL carrier after transmitting the first resource allocation, the first data transmission including a first waveform based at least in part on the first resource allocation. For example, the PRT processing circuitry 1343 together with the communication and processing circuitry 1341 and the transceiver 1310, shown and described above in connection with FIG. 13, may provide a means to receive a first data transmission on the SUL carrier after transmitting the first resource allocation.

In some examples, the base station may transmit a second resource allocation for a second uplink carrier different from the SUL carrier, the second resource allocation indicating a second set of transmission tones. In some examples, the base station may receive a second data transmission on the second uplink carrier after transmitting the second resource allocation, the second data transmission including a second waveform based at least in part on the second resource allocation. In some examples, the SUL carrier is associated with a first frequency band, the second uplink carrier is associated with a second frequency band, and the first frequency band is lower in frequency than the second frequency band. In some examples, the second uplink carrier is a Third Generation Partnership Project (3GPP) 5G New Radio (NR) carrier.

In some examples, the base station may determine that a user equipment is to transmit the second set of transmission tones without PRTs. In some examples, the base station may transmit an indication to the user equipment to exclusively use the first PRT sequence after determining that the second set of transmission tones are to be transmitted without PRTs. In some examples, to determine that the user equipment is to transmit the second set of transmission tones without PRTs, the base station may determine that an amount of traffic scheduled to be transmitted on a resource of the second uplink carrier exceeds a threshold, and elect to abstain from using PRTs on the resource after determining that the amount of traffic scheduled to be transmitted on the resource exceeds the threshold.

In some examples, the base station may identify a coverage limited condition for a user equipment. In some examples, the base station may transmit an indication to the user equipment to exclusively use the first PRT sequence after identifying the coverage limited condition for the user equipment.

In some examples, the second set of transmission tones may include a second set of data tones and a second set of peak reduction tones (PRTs), the second resource allocation further indicating a second set of data tone locations within a second bandwidth, the second resource allocation further indicating a second set of PRT locations within the second bandwidth, wherein the second set of PRT locations are arranged relative to the second set of data tone locations according to a second PRT sequence. In some examples, the second resource allocation may include an indication of the second PRT sequence. In some examples, the indication may include an index for a PRT table, and the PRT table indicates the first PRT sequence and the second PRT sequence.

In some examples, the first set of transmission tones may be associated with a first density of the first set of PRTs relative to the first set of data tones. The second set of transmission tones may be associated with a second density of the second set of PRTs relative to the second set of data tones. The first density may be higher than the second density.

In some examples, the first set of PRTs are defined such that a first peak to average power ratio (PAPR) associated with the first waveform satisfies a first PAPR threshold. In some examples, the second set of PRTs are defined such that a second peak to average power ratio (PAPR) associated with the second waveform satisfies a second PAPR threshold.

In some examples, the base station may transmit the first resource allocation and the second resource allocation to a user equipment via at least one downlink control information (DCI), at least one radio resource control (RRC) message, at least one medium access control-control element (MAC-CE), or a combination thereof.

Figure 15:
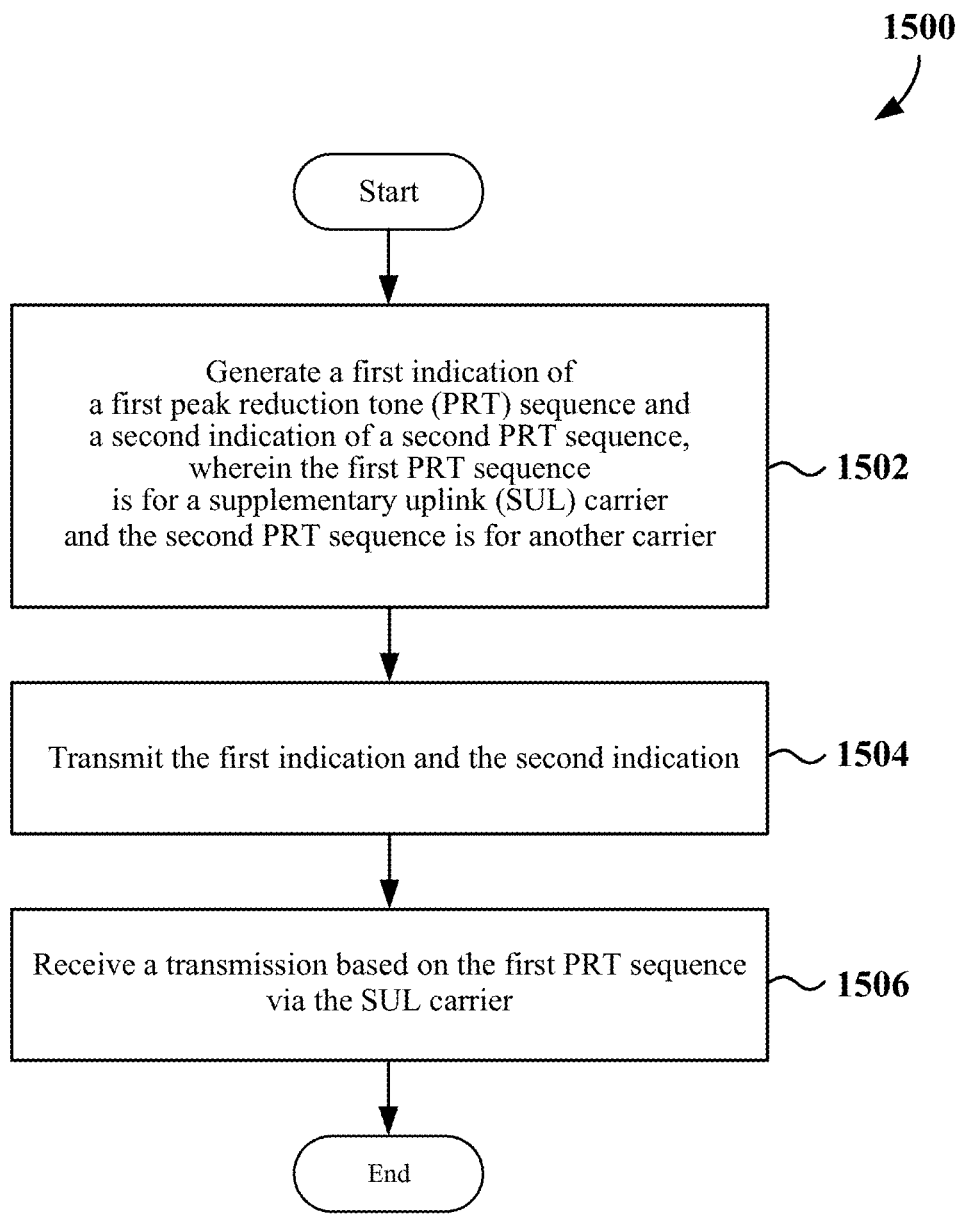
FIG. 15 is a flow chart of another example method for receiving on an SUL carrier according to some aspects.

FIG. 15 is a flow chart illustrating an example wireless communication method 1500 in accordance with some aspects of the disclosure. As described below, some or all illustrated features may be omitted in a particular implementation within the scope of the present disclosure, and some illustrated features may not be required for implementation of all examples. In some examples, the wireless communication method 1500 may be carried out by the BS 1300 illustrated in FIG. 13. In some examples, the wireless communication method 1500 may be carried out by any suitable apparatus or means for carrying out the functions or algorithm described below.

At block 1502, a base station may generate a first indication of a first peak reduction tone (PRT) sequence and a second indication of a second PRT sequence, wherein the first PRT sequence is for a supplementary uplink (SUL) carrier and the second PRT sequence is for another carrier. For example, the PRT configuration circuitry 1342, shown and described above in connection with FIG. 13, may provide a means to generate a first indication of a first peak reduction tone (PRT) sequence and a second indication of a second PRT sequence.

The first indication may include a first index for a PRT table. The second indication may include a second index for the PRT table. The PRT table may indicate (e.g., include entries for) the first PRT sequence and the second PRT sequence.

At block 1504, the base station may transmit the first indication and the second indication. For example, the PRT configuration circuitry 1342 together with the communication and processing circuitry 1341 and the transceiver 1310, shown and described above in connection with FIG. 13, may provide a means to transmit the first indication and the second indication.

At block 1506, the base station may receive a transmission based on the first PRT sequence via the SUL carrier. For example, the PRT processing circuitry 1343 together with the communication and processing circuitry 1341 and the transceiver 1310, shown and described above in connection with FIG. 13, may provide a means to receive a transmission based on the first PRT sequence via the SUL carrier.

In some examples, the base station may receive a second transmission based on the second PRT sequence. In some examples, the base station may generate a first resource allocation. In some examples, the base station may transmit the first resource allocation. The first resource allocation may include the first indication of the first PRT sequence. In some examples, the base station may generate a second resource allocation. In some examples, the base station may transmit the second resource allocation. The second resource allocation may include the second indication of the second PRT sequence.

In one configuration, the BS 1300 includes means for transmitting a first resource allocation for a supplementary uplink (SUL) carrier, the first resource allocation indicating a first set of transmission tones comprising a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence, and means for receiving a first data transmission on the SUL carrier after transmitting the first resource allocation, the first data transmission comprising a first waveform based at least in part on the first resource allocation. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 9, and 13, and utilizing, for example, the methods and/or algorithms described herein in relation to FIGS. 14 and 15.

The methods shown in FIGS. 11-12 and 14-15 may include additional aspects, such as any single aspect or any combination of aspects described below and/or in connection with one or more other processes described elsewhere herein.

In some examples, a method of wireless communication at a user equipment may include receiving a first indication of a first peak reduction tone (PRT) sequence and a second indication of a second PRT sequence. In some aspects the first PRT sequence is for a supplementary uplink (SUL) carrier and the second PRT sequence is for another carrier. The method may further include generating a first signal based on the first PRT sequence and transmitting the first signal on the SUL carrier.

In some examples, a user equipment may include a transceiver, a memory, and a processor communicatively coupled to the transceiver and the memory. The processor and the memory may be configured to receive a first indication of a first peak reduction tone (PRT) sequence and a second indication of a second PRT sequence. In some aspects the first PRT sequence is for a supplementary uplink (SUL) carrier and the second PRT sequence is for another carrier. The processor and the memory may also be configured to generate a first signal based on the first PRT sequence and transmit the first signal on the SUL carrier.

In some examples, a user equipment may include means for receiving a first indication of a first peak reduction tone (PRT) sequence and a second indication of a second PRT sequence. In some aspects the first PRT sequence is for a supplementary uplink (SUL) carrier and the second PRT sequence is for another carrier. The user equipment may further include means for generating a first signal based on the first PRT sequence and means for transmitting the first signal on the SUL carrier.

In some examples, an article of manufacture for use by a user equipment includes a non-transitory computer-readable medium having stored therein instructions executable by one or more processors of the user equipment to receive a first indication of a first peak reduction tone (PRT) sequence and a second indication of a second PRT sequence. In some aspects the first PRT sequence is for a supplementary uplink (SUL) carrier and the second PRT sequence is for another carrier. The computer-readable medium may also have stored therein instructions executable by one or more processors of the base station to generate a first signal based on the first PRT sequence and transmit the first signal on the SUL carrier.

One or more of the following features may be applicable to any of the method, the apparatuses, and the computer-readable medium of the preceding paragraphs. A second signal based on the second PRT sequence may be generated. The second signal may be transmitted on the other carrier. A first resource allocation may be received. The first resource allocation may include the first indication of the first PRT sequence. The first PRT sequence may be determined from the first indication. The first indication may include a first index for a PRT table. The PRT table may indicate (e.g., include entries for) the first PRT sequence and the second PRT sequence. A second resource allocation may be received. The second resource allocation may include the second indication of the second PRT sequence. The second PRT sequence may be determined from the second indication. The second indication may include a second index for the PRT table.

In some examples, a method of wireless communication at a base station may include generating a first indication of a first peak reduction tone (PRT) sequence and a second indication of a second PRT sequence. In some aspects the first PRT sequence is for a supplementary uplink (SUL) carrier and the second PRT sequence is for another carrier. The method may further include transmitting the first indication and the second indication and receiving a transmission based on the first PRT sequence via the SUL carrier.

In some examples, a base station may include a transceiver, a memory, and a processor communicatively coupled to the transceiver and the memory. The processor and the memory may be configured to generate a first indication of a first peak reduction tone (PRT) sequence and a second indication of a second PRT sequence. In some aspects the first PRT sequence is for a supplementary uplink (SUL) carrier and the second PRT sequence is for another carrier.

The processor and the memory may also be configured to transmit the first indication and the second indication and receive a transmission based on the first PRT sequence via the SUL carrier.

In some examples, a base station may include means for generating a first indication of a first peak reduction tone (PRT) sequence and a second indication of a second PRT sequence. In some aspects the first PRT sequence is for a supplementary uplink (SUL) carrier and the second PRT sequence is for another carrier. The base station may also include means for transmitting the first indication and the second indication and means for receiving a transmission based on the first PRT sequence via the SUL carrier.

In some examples, an article of manufacture for use by a base station includes a non-transitory computer-readable medium having stored therein instructions executable by one or more processors of the base station to generate a first indication of a first peak reduction tone (PRT) sequence and a second indication of a second PRT sequence. In some aspects the first PRT sequence is for a supplementary uplink (SUL) carrier and the second PRT sequence is for another carrier. The computer-readable medium may also have stored therein instructions executable by one or more processors of the base station to transmit the first indication and the second indication and receive a transmission based on the first PRT sequence via the SUL carrier.

One or more of the following features may be applicable to any of the method, the apparatuses, and the computer-readable medium of the preceding paragraphs. A second transmission based on the second PRT sequence may be received. A first resource allocation may be generated. The first resource allocation may include the first indication of the first PRT sequence. The first indication may include a first index for a PRT table. The PRT table may indicate (e.g., include entries for) the first PRT sequence and the second PRT sequence. A second resource allocation may be generated. The second resource allocation may include the second indication of the second PRT sequence. The second indication may include a second index for the PRT table.

The following provides an overview of several aspects of the present disclosure.

Aspect 1: A method for wireless communication at a user equipment, the method comprising: receiving a first resource allocation for a supplementary uplink (SUL) carrier, the first resource allocation indicating a first set of transmission tones comprising a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence; and transmitting a first data transmission on the SUL carrier, the first data transmission comprising a first waveform based at least in part on the first resource allocation.

Aspect 2: The method of aspect 1, wherein the first resource allocation comprises an indication of the first PRT sequence.

Aspect 3: The method of aspect 2, further comprising: determining the first PRT sequence from the indication.

Aspect 4: The method of any of aspects 2 through 3, wherein: the indication comprises an index for a PRT table; and the PRT table indicates the first PRT sequence and a second PRT sequence.

Aspect 5: The method of aspect 4, wherein: the PRT table comprises a plurality of entries; and an entry of the plurality of entries comprises at least one of the first PRT sequence, one or more parameters of a deterministic function for determining the first PRT sequence, a starting index associated with the first PRT sequence, an ending index associated with the first PRT sequence, or a combination thereof.

Aspect 6: The method of any of aspects 2 through 3, wherein the indication comprises a bit mask that indicates a first location of each of one or more PRTs of the first set of PRTs relative to a second location of each of one or more data tones of the first set of data tones.

Aspect 7: The method of any of aspects 1 through 6, further comprising: receiving a second resource allocation for a second uplink carrier different from the SUL carrier, the second resource allocation indicating a second set of transmission tones; and transmitting a second data transmission on the second uplink carrier using a second waveform based at least in part on the second resource allocation.

Aspect 8: The method of aspect 7, wherein: the SUL carrier is associated with a first frequency band; the second uplink carrier is associated with a second frequency band; and the first frequency band is lower in frequency than the second frequency band.

Aspect 9: The method of aspect 8, wherein the second uplink carrier is a Third Generation Partnership Project (3GPP) 5G New Radio (NR) carrier.

Aspect 10: The method of any of aspects 7 through 9, wherein the second set of transmission tones comprises a second set of data tones and a second set of PRTs, the second resource allocation further indicating a second set of data tone locations within a second bandwidth, the second resource allocation further indicating a second set of PRT locations within the second bandwidth, wherein the second set of PRT locations are arranged relative to the second set of data tone locations according to a second PRT sequence.

Aspect 11: The method of aspect 10, wherein the second resource allocation comprises an indication of the second PRT sequence.

Aspect 12: The method of aspect 11, further comprising: determining the second PRT sequence from the indication.

Aspect 13: The method of any of aspects 11 through 12, wherein: the indication comprises an index for a PRT table; and the PRT table indicates the first PRT sequence and the second PRT sequence.

Aspect 14: The method of any of aspects 10 through 13, wherein: the first set of transmission tones is associated with a first density of the first set of PRTs relative to the first set of data tones; the second set of transmission tones is associated with a second density of the second set of PRTs relative to the second set of data tones; and the first density is higher than the second density.

Aspect 15: The method of any of aspects 10 through 14, wherein: the first set of PRTs are defined such that a first peak to average power ratio (PAPR) associated with the first waveform satisfies a first PAPR threshold; and the second set of PRTs are defined such that a second peak to average power ratio (PAPR) associated with the second waveform satisfies a second PAPR threshold.

Aspect 16: The method of any of aspects 7 through 15, further comprising: receiving the first resource allocation and the second resource allocation from a base station via at least one downlink control information (DCI), at least one radio resource control (RRC) message, at least one medium access control-control element (MAC-CE), or a combination thereof.

Aspect 18: A method for wireless communication at a base station, the method comprising: transmitting a first resource allocation for a supplementary uplink (SUL) carrier, the first resource allocation indicating a first set of transmission tones comprising a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence; and receiving a first data transmission on the SUL carrier after transmitting the first resource allocation, the first data transmission comprising a first waveform based at least in part on the first resource allocation.

Aspect 19: The method of aspect 18, wherein the first resource allocation comprises an indication of the first PRT sequence.

Aspect 20: The method of aspect 19, wherein: the indication comprises an index for a PRT table; and the PRT table indicates the first PRT sequence and a second PRT sequence.

Aspect 21: The method of aspect 20, wherein: the PRT table comprises a plurality of entries; and an entry of the plurality of entries comprises at least one of the first PRT sequence, one or more parameters of a deterministic function for determining the first PRT sequence, a starting index associated with the first PRT sequence, an ending index associated with the first PRT sequence, or a combination thereof.

Aspect 22: The method of aspect 19, wherein the indication comprises a bit mask that indicates a first location of each of one or more PRTs of the first set of PRTs relative to a second location of each of one or more data tones of the first set of data tones.

Aspect 23: The method of any of aspects 18 through 22, further comprising: transmitting a second resource allocation for a second uplink carrier different from the SUL carrier, the second resource allocation indicating a second set of transmission tones; and receiving a second data transmission on the second uplink carrier after transmitting the second resource allocation, the second data transmission comprising a second waveform based at least in part on the second resource allocation.

Aspect 24: The method of aspect 23, wherein: the SUL carrier is associated with a first frequency band; the second uplink carrier is associated with a second frequency band; and the first frequency band is lower in frequency than the second frequency band.

Aspect 25: The method of any of aspects 23 through 24, further comprising: identifying a coverage limited condition for a user equipment; and transmitting an indication to the user equipment to exclusively use the first PRT sequence after identifying the coverage limited condition for the user equipment.

Aspect 26: The method of any of aspects 23 through 25, wherein the second set of transmission tones comprises a second set of data tones and a second set of PRTs, the second resource allocation further indicating a second set of data tone locations within a second bandwidth, the second resource allocation further indicating a second set of PRT locations within the second bandwidth, wherein the second set of PRT locations are arranged relative to the second set of data tone locations according to a second PRT sequence.

Aspect 27: The method of aspect 26, wherein: the second resource allocation comprises an indication of the second PRT sequence; the indication comprises an index for a PRT table; and the PRT table indicates the first PRT sequence and the second PRT sequence.

Aspect 28: The method of any of aspects 26 through 27, wherein: the first set of transmission tones is associated with a first density of the first set of PRTs relative to the first set of data tones; the second set of transmission tones is associated with a second density of the second set of PRTs relative to the second set of data tones; and the first density is higher than the second density.

Aspect 29: The method of any of aspects 26 through 28, wherein: the first set of PRTs are defined such that a first peak to average power ratio (PAPR) associated with the first waveform satisfies a first PAPR threshold; and the second set of PRTs are defined such that a second peak to average power ratio (PAPR) associated with the second waveform satisfies a second PAPR threshold.

Aspect 30: A user equipment comprising: a transceiver configured to communicate with a radio access network, a memory, and a processor communicatively coupled to the transceiver and the memory, wherein the processor and the memory are configured to perform any one of aspects 1 through 16.

Aspect 31: An apparatus configured for wireless communication comprising at least one means for performing any one of aspects 1 through 16.

Aspect 32: A non-transitory computer-readable medium storing computer-executable code, comprising code for causing an apparatus to perform any one of aspects 1 through 16.

Aspect 33: A base station comprising: a transceiver, a memory, and a processor communicatively coupled to the transceiver and the memory, wherein the processor and the memory are configured to perform any one of aspects 18 through 29.

Aspect 34: An apparatus configured for wireless communication comprising at least one means for performing any one of aspects 18 through 29.

Aspect 35: A non-transitory computer-readable medium storing computer-executable code, comprising code for causing an apparatus to perform any one of aspects 18 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 9, 10, and 13 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
    a transceiver;
    a memory; and
    a processor coupled to the transceiver and the memory, wherein the processor and the memory are configured to:
        receive a first resource allocation for a supplementary uplink (SUL) carrier via the transceiver, the first resource allocation indicating a first set of transmission tones comprising a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence; and
        transmit a first data transmission on the SUL carrier via the transceiver, the first data transmission comprising a first waveform based at least in part on the first resource allocation.

2. The user equipment of claim 1, wherein the first resource allocation comprises an indication of the first PRT sequence.

3. The user equipment of claim 2, wherein the processor and the memory are further configured to:
    determine the first PRT sequence from the indication.

4. The user equipment of claim 2, wherein:
    the indication comprises an index for a PRT table; and
    the PRT table indicates the first PRT sequence and a second PRT sequence.

5. The user equipment of claim 4, wherein:
    the PRT table comprises a plurality of entries; and
    an entry of the plurality of entries comprises at least one of the first PRT sequence, one or more parameters of a deterministic function for determining the first PRT sequence, a starting index associated with the first PRT sequence, an ending index associated with the first PRT sequence, or a combination thereof.

6. The user equipment of claim 2, wherein the indication comprises a bit mask that indicates a first location of each of one or more PRTs of the first set of PRTs relative to a second location of each of one or more data tones of the first set of data tones.

7. The user equipment of claim 1, wherein the processor and the memory are further configured to:
    receive a second resource allocation for a second uplink carrier different from the SUL carrier, the second resource allocation indicating a second set of transmission tones; and
    transmit a second data transmission on the second uplink carrier using a second waveform based at least in part on the second resource allocation.

8. The user equipment of claim 7, wherein:
    the SUL carrier is associated with a first frequency band;
    the second uplink carrier is associated with a second frequency band; and
    the first frequency band is lower in frequency than the second frequency band.

9. The user equipment of claim 8, wherein the second uplink carrier is a Third Generation Partnership Project (3GPP) 5G New Radio (NR) carrier.

10. The user equipment of claim 7, wherein the second set of transmission tones comprises a second set of data tones and a second set of PRTs, the second resource allocation further indicating a second set of data tone locations within a second bandwidth, the second resource allocation further indicating a second set of PRT locations within the second bandwidth, wherein the second set of PRT locations are arranged relative to the second set of data tone locations according to a second PRT sequence.

11. The user equipment of claim 10, wherein the second resource allocation comprises an indication of the second PRT sequence.

12. The user equipment of claim 11, wherein the processor and the memory are further configured to:
determine the second PRT sequence from the indication.

13. The user equipment of claim 11, wherein:
the indication comprises an index for a PRT table; and
the PRT table indicates the first PRT sequence and the second PRT sequence.

14. The user equipment of claim 10, wherein:
the first set of transmission tones is associated with a first density of the first set of PRTs relative to the first set of data tones;
the second set of transmission tones is associated with a second density of the second set of PRTs relative to the second set of data tones; and
the first density is higher than the second density.

15. The user equipment of claim 10, wherein:
the first set of PRTs are defined such that a first peak to average power ratio (PAPR) associated with the first waveform satisfies a first PAPR threshold; and
the second set of PRTs are defined such that a second peak to average power ratio (PAPR) associated with the second waveform satisfies a second PAPR threshold.

16. The user equipment of claim 7, wherein the processor and the memory are further configured to:
receive the first resource allocation and the second resource allocation from a base station via at least one downlink control information (DCI), at least one radio resource control (RRC) message, at least one medium access control-control element (MAC-CE), or a combination thereof.

17. A method for wireless communication at a user equipment, the method comprising:
receiving a first resource allocation for a supplementary uplink (SUL) carrier, the first resource allocation indicating a first set of transmission tones comprising a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence; and
transmitting a first data transmission on the SUL carrier, the first data transmission comprising a first waveform based at least in part on the first resource allocation.

18. A base station, comprising:
a transceiver;
a memory; and
a processor coupled to the transceiver and the memory, wherein the processor and the memory are configured to:
transmit a first resource allocation for a supplementary uplink (SUL) carrier, the first resource allocation indicating a first set of transmission tones comprising a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence; and
receive a first data transmission on the SUL carrier via the transceiver after transmitting the first resource allocation, the first data transmission comprising a first waveform based at least in part on the first resource allocation.

19. The base station of claim 18, wherein the first resource allocation comprises an indication of the first PRT sequence.

20. The base station of claim 19, wherein:
the indication comprises an index for a PRT table; and
the PRT table indicates the first PRT sequence and a second PRT sequence.

21. The base station of claim 20, wherein:
the PRT table comprises a plurality of entries; and
an entry of the plurality of entries comprises at least one of the first PRT sequence, one or more parameters of a deterministic function for determining the first PRT sequence, a starting index associated with the first PRT sequence, an ending index associated with the first PRT sequence, or a combination thereof.

22. The base station of claim 19, wherein the indication comprises a bit mask that indicates a first location of each of one or more PRTs of the first set of PRTs relative to a second location of each of one or more data tones of the first set of data tones.

23. The base station of claim 18, wherein the processor and the memory are further configured to:
transmit a second resource allocation for a second uplink carrier different from the SUL carrier, the second resource allocation indicating a second set of transmission tones; and
receive a second data transmission on the second uplink carrier after transmitting the second resource allocation, the second data transmission comprising a second waveform based at least in part on the second resource allocation.

24. The base station of claim 23, wherein:
the SUL carrier is associated with a first frequency band;
the second uplink carrier is associated with a second frequency band; and
the first frequency band is lower in frequency than the second frequency band.

25. The base station of claim 23, wherein the processor and the memory are further configured to:
identify a coverage limited condition for a user equipment; and
transmit an indication to the user equipment to exclusively use the first PRT sequence after identifying the coverage limited condition for the user equipment.

26. The base station of claim 23, wherein the second set of transmission tones comprises a second set of data tones and a second set of PRTs, the second resource allocation further indicating a second set of data tone locations within a second bandwidth, the second resource allocation further indicating a second set of PRT locations within the second bandwidth, wherein the second set of PRT locations are arranged relative to the second set of data tone locations according to a second PRT sequence.

27. The base station of claim 26, wherein:
the second resource allocation comprises an indication of the second PRT sequence;
the indication comprises an index for a PRT table; and
the PRT table indicates the first PRT sequence and the second PRT sequence.

28. The base station of claim 26, wherein:
the first set of transmission tones is associated with a first density of the first set of PRTs relative to the first set of data tones;
the second set of transmission tones is associated with a second density of the second set of PRTs relative to the second set of data tones; and
the first density is higher than the second density.

29. The base station of claim 26, wherein:
the first set of PRTs are defined such that a first peak to average power ratio (PAPR) associated with the first waveform satisfies a first PAPR threshold; and
the second set of PRTs are defined such that a second peak to average power ratio (PAPR) associated with the second waveform satisfies a second PAPR threshold.

30. A method for wireless communication at a base station, the method comprising:

transmitting a first resource allocation for a supplementary uplink (SUL) carrier, the first resource allocation indicating a first set of transmission tones comprising a first set of data tones and a first set of peak reduction tones (PRTs), the first resource allocation further indicating a first set of data tone locations within a first bandwidth, the first resource allocation further indicating a first set of PRT locations within the first bandwidth, wherein the first set of PRT locations are arranged relative to the first set of data tone locations according to a first PRT sequence; and receiving a first data transmission on the SUL carrier after transmitting the first resource allocation, the first data transmission comprising a first waveform based at least in part on the first resource allocation.

* * * * *